United States Patent
Chu et al.

(10) Patent No.: US 6,231,011 B1
(45) Date of Patent: May 15, 2001

(54) SATELLITE ANGULAR MOMENTUM CONTROL SYSTEM USING MAGNET-SUPERCONDUCTOR FLYWHEELS

(75) Inventors: Wei-Kan Chu, Pearland; Ki Bui Ma, Jersey Village, both of TX (US); Jang-Horng Yu, Blacksburg, VA (US); Quark Yung-Sung Chen, Houston, TX (US); Eujeong Lee, Houston, TX (US); Yevgeniy Postrekhin, Houston, TX (US)

(73) Assignee: University of Houston System, Houston, TX (US)

( * ) Notice: Subject to any disclaimer, the term of this patent is extended or adjusted under 35 U.S.C. 154(b) by 0 days.

(21) Appl. No.: 09/184,914

(22) Filed: Nov. 2, 1998

(51) Int. Cl.$^7$ ...................................................... B64G 1/28
(52) U.S. Cl. ........................... 244/165; 505/166; 244/166
(58) Field of Search ..................... 244/165, 166; 505/166

(56) References Cited

U.S. PATENT DOCUMENTS

| | | | |
|---|---|---|---|
| 4,688,746 | * | 8/1987 | Cooper ................................. 244/165 |
| 5,540,116 | * | 7/1996 | Hull et al. ......................... 505/166 X |
| 5,567,672 | * | 10/1996 | Terentiev et al. ..................... 505/166 |
| 5,747,426 | * | 5/1998 | Abboud ................................ 505/166 |
| 5,831,362 | * | 11/1998 | Chu et al. ......................... 505/166 X |

* cited by examiner

Primary Examiner—Robert P. Swiatek
(74) Attorney, Agent, or Firm—J. M. Gilbreth; Gilbreth & Associates, P.C.

(57) ABSTRACT

A torque/reactive momentum wheel control system for use in satellites for dynamic attitude maintenance and alteration where the flywheel of each momentum wheel is levitated by a high-temperature superconducting element repulsively interacting with permanent magnets in the flywheel. The spin rate (rpm) of the flywheel being controlled by either an active magneto or electromagneto drive system. Each momentum wheel is cooled by a cryo-cooler and can have a total weight of about 10 Kg to a fraction of 1 Kg and delivering 3.5 Js with less than 1 W loss.

20 Claims, 23 Drawing Sheets

SATELLITE ANGULAR MOMENTUM CONTROL SYSTEM USING MAGNET-SUPERCONDUCTOR FLYWHEELS

BACKGROUND OF THE INVENTION

1. Field of the Invention

The present invention relates to satellite angular momentum control systems having at least one magnet-superconductor momentum storage device.

More particularly, the present invention relates to satellite angular momentum control systems for maintaining a satellite in a given attitude and spin orientation, for changing a satellite attitude and/or spin orientation, for measuring a satellite angular velocity vector and for dynamic bias for orbital yaw steering, where the momentum storage or gyro system incorporates at least one, and preferably a plurality, magnet-superconductor momentum storage or flywheel devices. Moreover, the present invention relates to an attitude control system.

2. Description of the Related Art

Satellites are aligned in orbit by to general methods. One method involves using attitude and spin jets to orient or change the orientation of a satellite in orbit. The second method, and the method to which this invention pertains, involves the use of momentum storage devices the balance of which maintains the satellite in a given orientation with respect to the sun or the earth or any other fixed object. The amount of momentum stored in each device controls the exact orientation of the satellite as well as its spin axis. To change the orientation and spin of the satellite, the momentum of one or all of the momentum storage devices are changed which in turn changes the angular momentum of the satellite resulting in its orientation change.

Flywheels have been well-known as one of the oldest ancient mechanical designs in human history. Historically, the first flywheel dates back to 3000 BC, when the flywheel was recognized as the "potter's wheel". Essentially being a mechanical battery, flywheel energy storage (FES) system, many believe, could be one of the most efficient means to solve two critical problems faced by modern society: the rapid increase in the use of energy and the consequent impact of energy consumption on the environment.

Of particular concern to a flywheel energy storage device is its overall efficiency, which is dictated by four major factors: (1) motor/generator conversion efficiency; (2) power conditioning system efficiency; (3) windage drag; and (4) flywheel bearing efficiency.

Recent developments in new materials and magnetic bearings using electromagnetic levitation resurrect the interests of scientists and engineers in advancing the flywheel technology for energy storage applications.

Conventional mechanical bearings used in conjunction with high rotational speed devices are subject to metal wear, noise, vibration and friction heating problems. These problems can often lead to seizure or other failure of the bearing. In addition, mechanical bearings often require lubricants which fail in severe environments such as those commonly encountered in outer space. Failure of conventional liquid lubricants in outer space is usually due to the vacuum conditions that cause the lubricants to out gas, leaving bearing surfaces dry and resulting in the ultimate failure of the bearings. Additionally, in outer space, temperatures are very low so most lubricants solidify and simply do not function as lubricants.

As a result of these and other shortcomings, there has been considerable emphasis on the developments of alternatives to mechanical bearings. For example, work has been done to develop more efficient air bearings, as well as magnetically suspended bearings.

One problem with air bearings is that they require a complete pneumatic system, including pumps, valves, seals, and conduits, for their operation. Another shortcoming of air bearings is that they result in a continuous energy loss. For example, a high speed cryo-cooler system in outer space applications, would suffer a 10–20 watt energy loss due to bearing friction losses. Even in non-space applications, use of an air system adds significant cost, size, and weight to the bearing package and introduces various reliability problems normally associated with pneumatic system components.

Because of the fine tolerances required, which are on the order of one ten-thousandth of an inch, air bearings themselves are difficult to manufacture, and thus expensive. Furthermore, air bearings are highly vulnerable to contaminants. A particle of dust as small as four ten-thousandths of an inch can interfere with air gaps and clog pores of graphite or other diffusive coatings.

One obvious approach toward reducing friction losses from two relatively moving surfaces is to exert supporting force without physical contacts. Thus, magnetically suspended bearings have been developed as an alternative to air bearings.

While active magnetic bearing systems are now a well-developed and widely accepted technology, no intrinsic stability exists for a magnetized body under the influence of an external magnetic field. This phenomenon is known as Earnshaw's theorem and occurs in any potential satisfying the Laplace equation, which includes electric, magnetic, and gravitational potentials.

Thus, in an active magnetic bearing, feedback control is applied to an electromagnet or combinations of permanent magnets and electromagnets to accomplish dynamic stability.

Because permanent magnet magnetic field strength is generally limited, the use of permanent magnets is limited to applications where very small forces are adequate. Electromagnets can supply considerably more magnetic force than comparable permanent magnets, and their magnetic fields can be altered by use of feedback control systems, and are thus generally preferred.

Unfortunately, the required feedback control systems with the attendant complex sensor and actuator electronics, add considerably to the cost, size, and operational complexity of an active magnetic bearing system.

It has been appreciated for years that magnetic fields strongly interact with superconducting materials. For example, stable levitation of a superconductor in an external magnetic field has long been demonstrated. Levitation of low temperature superconductors (LTS) by a charged superconducting coil and permanent magnet levitated above a bowl-shaped LTS are some classic demonstrations of superconductivity. Such systems are technically considered passive bearings, since there is no explicit use of feedback control. However, such systems are effectively active, that is active per se, since the intrinsic opposite magnetization constantly induced is fulfilling the same function of maintaining a dynamically stable levitation as a feedback control system.

The most distinctive property of a superconductive material is its loss of electrical resistance when it is at or below a critical temperature. This critical temperature is an intrinsic property of the material and is referred to as the superconducting transition temperature of the material, $T_c$.

Recent research activities have brought the discovery of "high temperature superconducting" ("HTS") compounds. HTS compounds are those which superconduct at and below a critical temperature, $T_c$, which is above the boiling point temperature of nitrogen.

Following the discovery of superconductivity in a rare earth-alkaline earth-Cu oxide system of a perovskite crystalline structure, a new class of rare earth-alkaline earth-copper oxides was discovered which are superconductive at temperatures above the boiling point of liquid nitrogen, 77° K. These new rare earth-alkaline earth-copper oxides are now commonly referred to as "123" high-temperature superconductors in reference to the stoichiometry in which the rare earth, alkaline earth, and copper metal atoms are present, namely a ratio of 1:2:3.

Since they are superconductive at temperatures greater than 77° K, the new CuO high temperature superconductors may be cooled with liquid nitrogen, which is a far less costly refrigerant than helium. As a result, the rather complex thermal insulation and helium-recycling systems, necessary to avoid wasting the expensive helium coolant required for the low temperature superconducting material previously known, are no longer necessary. The HTS compounds simplify and enhance the reliability of commercial applications of superconductors. Liquid nitrogen is about 2000 times more efficient to use in terms of cost, when both the refrigerant itself and the associated refrigerant unit design are considered.

Magnetic fields are disclosed for bearings in U.S. Pat. No. 3,810,683. Use of superconductors for support bearings are taught in U.S. Pat. No. 3,378,315, wherein superconducting material is used for a spindle bearing with either permanent magnets or electromagnets providing the supporting magnetic field. U.S. Pat. No. 3,026,151 shows superconducting bearings with the actuator coils likewise formed of superconducting materials.

The recent advances in superconducting materials and the parallel advancements in the field of permanent magnets have made it possible to economically and efficiently couple a superconducting member with a magnetic member to produce highly efficient and relatively inexpensive bearings.

Superconductive materials are of two basic types, designated as Type I and Type II. Efforts have been made in the past to improve magnetic bearing technology by maintaining either the bearing member or the rotating member, or both, in a Type I superconducting state to achieve sufficient magnetic pressure to provide the desired degree of levitation. Unlike Type II superconductors, Type I superconductors are incapable of effecting suspension.

Type I superconductors feature perfect diamagnetism up to a critical applied field, at which point superconductivity is lost and the magnetization of the sample vanishes abruptly. Examples of superconducting bearings of Type I materials can be found in U.S. Pat. Nos. 3,493,274 and 3,026,151. In order to achieve stability in these systems, the bearing structures must rely on either a mechanical rotary support, or must employ superconductors shaped to provide a laterally stable configuration.

The recent discoveries of high temperature superconductors involve Type II materials. Whereas a Type I superconductor completely blocks out magnetic flux from its interior, a phenomenon known as diamagnetism, Type II superconductors allow a certain amount of magnetic flux to penetrate into the interior of the material, producing a suspension effect in addition to a levitation effect. Under such conditions, circulating superconducting currents are established within the superconductor.

A typical example of a system featuring a combination of Type II superconductors and permanent magnets is disclosed in U.S. Pat. No. 4,886,778, which discloses a rotating shaft having two ends, each of which contains a permanent magnet and rotates in a socket clad with superconducting material. The shaft is made to levitate above the sockets by the repulsive forces which exist between the magnets and the superconductors. The incorporation of superconductors into the bearing design offers the possibility of rendering the bearings entirely passive. The design disclosed in U.S. Pat. No. 4,886,778 has the potential for achieving very high rotational speeds, in excess of ten thousand rpm. The interaction between the rotating magnetic axial element and its stationary superconducting support takes place across a gap permeated by a strong magnetic field emanating from permanent magnets embedded in the rotating element.

However, it is desirable to increase the amount of thrust between the superconductor and the magnets with a corresponding increase in the stability. An increased amount of thrust could easily be obtained by utilizing repulsing pairs of magnets in addition. Increased thrust is obtained by increasing the magnetic field on one or both of the magnets, either by utilizing stronger permanent magnets, or increasing the current to an electromagnet. However, as the thrust is increased between repulsing pairs of magnets, the instability of those magnets in the plane normal to the magnet-magnet repulsion axis increases.

U.S. Pat. No. 4,879,537 discloses the use of a superconductor located in the magnet-magnet attraction axis between two attracting magnets. For attracting magnets the instability is along the magnet-magnet attraction axis. However, this system suffers because it is not always desirable to stabilize two attracting magnets by placing a superconductor in the magnet-magnet attraction axis between magnets.

U.S. Pat. No. 5,159,219 discloses the use of high temperature superconductors in close proximity with permanent magnets to make essentially frictionless bearings. Two short comings of the disclosed arrangement are low thrust and low stiffness.

U.S. Pat. No. 5,177,387 discloses the use of an additional magnet to supplement the thrust in a magnet/superconductor system. Since this additional magnet provides the necessary thrust, the high temperature superconductor is left to provide stability. Unfortunately, this arrangement introduces instability from the magnets.

In copending U.S. patent application Ser. No. 08/895,387 filed Jul. 16, 1997; a magnet-superconductor flywheel and levitation systems is disclosed where land-based energy storage flywheels are replaced with magnet-superconductor flywheels having improved properties including stability, storage capacities and storage efficiencies.

The following patents relate to satellite momentum bias control systems using momentum storage devices based on traditional electromechanical devices: U.S. Pat. Nos. 5,826,829, 5,820,079, 5,820,078, 5,814,959, 5,787,368, 5,758,846, 5,752,675, 5,738,309, 5,723,923, 5,692,763, 5,692,707, 5,667,171, 5,608,634, and 5,605,139, incorporated herein by reference.

However, the prior art does not disclose a practical design for creating satellite momentum control systems having lower weight, more stable and longer lasting control systems for satellite attitude and spin control, especially, for low orbit communication satellites utilizing HTS materials. These and other needs in the art will become apparent to those of skill in the art upon review of this specification, including its claims and drawings.

SUMMARY OF THE INVENTION

The present invention provides a practical design for a light weight, momentum-bias attitude control system capable maintaining and altering satellite orientation in space including nadir pointing.

The present invention also provides a momentum control system including at least one and preferably a plurality of HTS momentum storage devices or wheels and a cooling system for maintaining the devices at a temperature at or preferably below a $T_c$ temperature of the HTS. Each wheel includes rotatable flywheel having at least one central region, preferably two central regions opposite one another. Each central region includes at least one permanent ring magnet and preferably two ring magnets positioned concentrically and positioned and separated by spacers. Two ring magnets are needed if a single pair of permanent magnets and a single levitation unit are used. The ring magnets are oppositely poled with their pole axis coincident with cylindrical axis of each ring and coincident with the spin axis of the flywheel.

Positioned above each central region in which the ring magnet(s) are located, the flywheel system further includes a levitation system for levitating the flywheel. The levitation system repulsively interacts with the centrally disposed flywheel ring magnets and includes a HTS (high-temperature superconducting) element enclosed in a reservoir. Circulated through the reservoir via a coolant inlet and outlet is a coolant from the cryo-cooler described in FIGS. 16(a) and 16(b). The cryo-coolers can be any helium based high efficiency cryo-cooler, but the preferred cooler is a LC1-002 Long Life Linear Cooler and LC1 Dewar available from EG&G Optoelectronics in Montgomeryville, Pa. The two levitation systems operate in conjunction to suspend the flywheel between the two levitation units by repulsively interacting with the permanent ring magnets on the flywheel. When using oppositely poled concentrically disposed ring magnets, a single levitation unit can be used because the oppositely poled ring magnets are simultaneously attracted to and repelled from the levitation unit, thereby resulting in a stable levitation distance. Deviation from the stable levitation distance are resisted and a Hook's law restoring force acts on the wheel to restore it to its equilibrium state if a deviation occurs. Two levitation units are preferred to improve stability and to act as a double back up system. Thus, levitation system ensures that the fly wheel does not come in direct contact with an other wheel component during normal operation.

The wheel also includes an active magneto or electromagnets motor for imparting spin to the flywheel. The wheel also include spin sensors, motor acceleration sensor and wheel stability sensors as well as temperature sensors in the HTS reservoir and elements. These sensors transmit data to an on-board computer that analyzes the data to determine proper torque and momentum control. The motor is electrically connected to a power supply as are the sensors. The power supply and thus the current supplied to the motor which determines the spin rate (rpm) and consequently the momentum in the wheel is also under computer control. By changing current to the motor, the computer can affect a change in spin rate at one or every wheel causing the vehicle (satellite) to change its position in response to the change in overall angular momentum imparted to the satellite by the wheels.

The present invention also provides a torque/reactive momentum control device including at least one momentum wheel, where each wheel includes a rotatable flywheel including first and second central regions, each region having inner and outer ring magnets concentrically disposed therein, a first spacer located inside each inner ring magnet and a second spacer interposed between each inner and outer ring magnet pair, where the central regions are oppositely and symmetrically disposed on the flywheel relative to an axis of rotation of the flywheel, where each inner and outer ring magnet pair are oppositely poled and the poles are aligned with the flywheel rotation axis.

The device also includes a levitation system including first and second HTS units for repulsively interacting with ring magnet pairs and positioned above the central regions of the flywheel, where each unit comprises an HTS element enclosed in a coolant reservoir having a coolant inlet and outlet for maintaining the HTS element below its critical temperature, $T_c$ and a motor for actively interacting with the flywheel to impart a controlled spin to the flywheel. The device further includes a cooling system for supplying coolant to the HTS elements of each momentum wheel to maintain each HTS element below their critical temperature, a control system in electric communication with the wheels for maintaining a controlled flywheel, spin rate of each wheel and a power supply for supplying power to each wheel, cryo-cooler and control system.

The present invention further provides a satellite including a platform and a torque/reactive momentum control device mounted on the platform. The momentum control device includes a plurality of momentum wheels of this invention, a cooling system for supplying coolant to the HTS elements of each momentum wheel to maintain each HTS element below their critical temperature, a control system in electric communication with the wheels for maintaining a controlled flywheel, spin rate of each wheel, and a power supply for supplying power to each wheel, cryo-cooler and control system, where the torque/reactive momentum control device controls the attitude and orientation of the satellite. The satellite can be a communication satellite with a nadir positioned receiver and transmitter.

The present invention further provides an attitude control system including a torque reaction/momentum HTS wheel device of the present invention and a computer-based control system for receiving sensor and command information and generating feedback control to the HTS momentum devices to maintain or change the orientation of the vehicle in which the system is a part.

BRIEF DESCRIPTION OF THE DRAWINGS

FIG. 7(*b*) is a schematic of a proposed embodiment in which magnets 88 and 90 as shown in FIG. 7(*a*) have been replaced with magnet 88A.

FIG. 16(*b*) depicts a gyroscope momentum exchange system having trigonally arranged HTS momentum wheels coupled to a centrally located cryo-cooler.

DETAILED DESCRIPTION OF THE INVENTION

Figure 1:
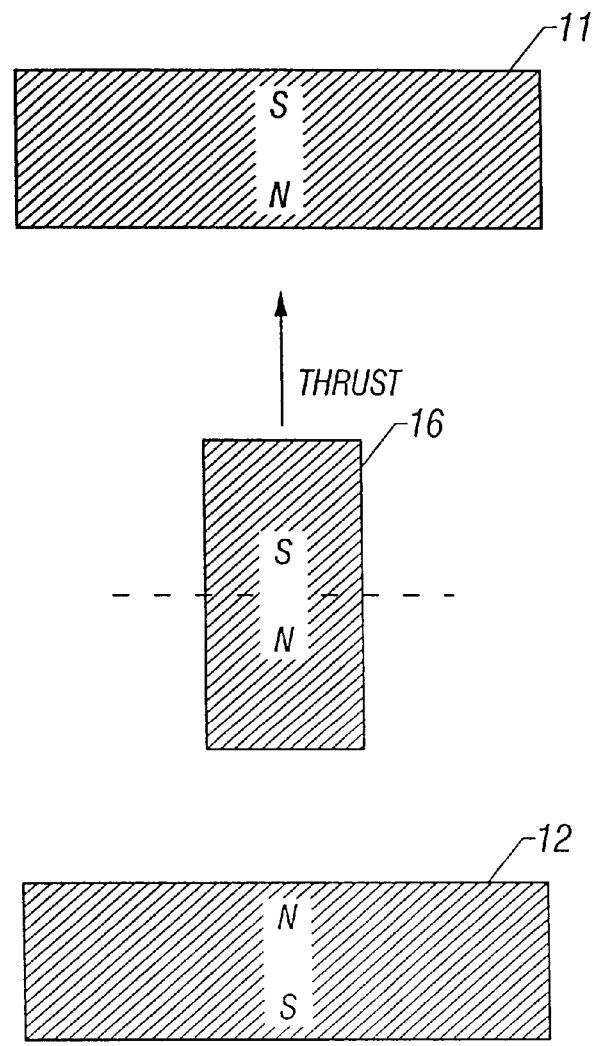
FIG. 1 is a schematic of an axial gap design for magnets 11 and 12 which may be parts of a stator, and magnet 16 which may be part of a rotor.

The present invention provides for magnetic systems which have zero diagonal stiffness with respect to translational and rotational degrees of freedom, yet which are capable of producing a high thrust.

The inventors have now found that low weight, highly stable, active momentum wheels can be designed using HTS flywheels. Such momentum wheels find use in gyro-scope-based momentum exchange and guidance systems where totally passive levitated momentum wheels using superconductors replace standard electromechanical momentum wheels. The inventors have found that passive levitated momentum wheels can be constructed with weights from fractions of a kilogram to several kilograms and with rotation rates of between one and tens of thousand rpm. Such wheels can have power requirements of less than 1 watt associated primarily with an associated miniature cryo-cooler and capacities of less than 1 Js to about 3.5 Js. For wheels having capacities greater than 3.5 Js to about 50 Js or higher, the power requirement will be between about 1 and about 10 watts. Of course, capacity and power requirements are generally coupled so the higher the capacity, the higher the power requirement. Lower capacities with corresponding lower power requirements are also easily accommodated.

The wheels can be of any size; while preferred wheels have a diameter which is greater than their height, wheels can be constructed with heights greater than their diameter (cigar shaped instead of disk shaped). Preferably, the wheels are disk shaped and have a preferred size of greater than about 1" and less than 10" in diameter and have a preferred diameter to height (d:h) ratio between about 1 and about 10 with between about 1 and 6 being preferred. A d:h of 0.4 corresponds to a heights between about 0.4" to about 4" for wheels having a diameter between about 1" and about 10". The wheel mass is preferably between about 0.1 Kg to about 10 Kg, or higher or lower as desired. The most preferred wheel size is between about 1" to about 10" in diameter having a d:h between about 1 and about 4 and a mass between about 1 and about 5 Kg. Of course, more and less massive wheels are allowed as well recognizing that the smaller the mass the faster the fly must be rotated to achieve and maintain a give angular momentum.

The flywheels are levitated by an HTS elements positioned parallel to a face of a permanent magnet either embedded in or attached to the flywheel symmetrically disposed relative to its axis of rotation. The permanent magnet has its poles aligned with the flywheel axis of rotation. If the magnet is a solid cylindrical or disk magnet or a single ring magnet, then the HTS elements would be configured to produce a repulsive force acting against the pole face of the magnet. The HTS element has its face parallel to the face of the magnet. The permanent magnet on the flywheel can also comprise two or more ring magnets. Preferably, the ring magnets are concentrically disposed relative to the rotation axis of the flywheel. For two ring magnets, the magnets are preferably, oppositely poled so that the HTS element simultaneously attracts and repels the ring pair causing the flywheel to adopt an equilibrium gap position above the HTS surface. This gap will be maintained as long as the HTS element is maintained at a temperature below its critical temperature. For present day HTS materials, the preferred cooling temperature is generally between about 40° K and 77° K. As HTS improve, the operating temperate could increase to the ambient temperature of space with shielding against direct sun light.

Obviously, only one HTS element is needed and one permanent magnet on the flywheel. However, for better stability and to build in an automatic backup, the wheels are generally constructed with two HTS elements interacting with two sets of permanent magnets on the flywheel oppositely configured relative to the spin axis of the wheel. Besides a permanent magnet, the flywheel could include a coil positioned to produce a magnetic field with poles coincident with the spin axis of the flywheel. This coil arrangement would accomplish the same levitation result as the permanent magnets, but would require current to maintain. Of course, HTS materials and cooling could be used to reduce the current requirement.

Although cryo-coolers using helium as the coolant are preferred, liquid based cryo-cooling systems using liquid nitrogen, air or oxygen can be used as well.

Today, the satellites are being designed to be smaller and lighter. They have gone from several thousand pounds to a mere few pounds. The cost and complexity of large satellite space missions continue to escalate. The norm is satellites weighing thousands of pounds and costing tens of million dollars. In terms of coverage, an army of small satellites is more flexible than one big satellite. In terms of cost, small satellite technology is the key to reduce launch expenses significantly and make the utilization of space affordable to a large section of humanity. There, the recent trend is to develop a "micro" satellite of which the weight ranges from 1 Kg to 100 Kg.

One of the essential components in a satellite is a momentum wheel for the purpose of altitude control. There are a number of potential attitude disturbance sources such as Earth's magnetic field, solar radiation pressure, and aerodynamic drag, which may affect the satellite. For the satellite to function properly, the altitude control device must be provided to keep the satellite within its designed trajectory. A reaction wheel is then used to maneuver the satellite through the change of its angular momentum. The reaction wheel is a crucial mechanical part of the satellite that must survive in harsh conditions such as low temperatures and vacuum, and it requires the performance of long life, maintenance free, and most of all, low power consumption. The solar cell battery of such a satellite provides limited source of energy output. Most of this valuable energy source is used for sensing, data transmission, and signal processing. Thus, the more one can save in the energy consumption, the more efficiently the satellite will serve its purpose.

In the course of miniaturization of the entire satellite, the momentum wheel has come to account for a bigger and bigger fraction of the total mass of the satellite, due to the nature of its function. A momentum wheel works by storing a desired amount of angular momentum along its axis. As angular momentum is the product of mass, size (more precisely, the square of radius gyration) and rotational speed, a given amount of angular momentum can be attained for a small object with very little mass only by increasing its rotating speed. Increased rotating speeds mean an increase in the energy required to maintain the angular momentum of the wheel against increased losses due to friction.

Since space is an environment poor in energy sources, we must reduce the frictional losses before we can use a smaller and less massive momentum wheel for altitude control and keep under the tight energy and power budget available on board a small satellite. To achieve the desired angular momentum and cut down the energy consumption, the current momentum wheels used in satellites are often designed to rotate at relatively low speeds (below 1000 rpm) due to the high energy consumption rate of conventional non-lubricated bearings and active magnetic bearings. High speed momentum wheels which rotate at 3,000 to 7,500 rmp have been manufactured but they either offer very low angular momentum (as low as 0.04 Nms) or they consume as high as 12 Watts (see attached chart). Therefore, to realize the microsat, a momentum wheel that employs very low energy rate (below 0.2 W) using HTS/magnetic bearings and offer very high angular momentum (up to 3.5 Nms) has been proposed and developed by the Texas Center of Superconductivity, University of Houston. This invention illustrates the construction of a momentum wheel that is 5 inches in diameter, 2 inches thick, with a mass of 1.25 Kg, and requires only . . . W to maintain the desired speed (see the momentum wheel performance table in the attached table). This will revolutionize the design of small satellite and advance the satellite communication technology. The HTS-magnetic radial-thrust bearing allows the momentum wheel to rotate at high speed with ultra low bearing loss.

The unique design characteristics of the superconducting levitated momentum wheel are described as follows:

1. Superconducting bearing using high temperature superconductor has the advantages of ultra-low friction, maintenance free, long life and stability. The momentum wheel using an HTS-magnetic bearing has the advantage of generating sufficient angular momentum at high speed with very low lost compared to active magnetic bearings.
2. One main disadvantage of using HTS is that the superconductor needs to be kept below its critical temperature (90 K). However, this can be easily achieved by using the unique cryo-cooler commonly employed in Infrared Detectors. It uses a Sterling engine and delivers cooling power 150 mW at 77 K. It consumes only 3.5 Watts and uses a 12V DC battery.
3. The excellent insulation material can reduce the heat loss to as low as 1 mW per centimeter layer of insulation at the ambient temperature of the satellite trajectory (normally 150 degree Kelvin). If good insulation is provided, the heat loss can be reduced to the micro Watts range. Hence, the cryo-cooler is needed initially to cool down the HTS. Afterwards, the cryo-cooler will only be used periodically to maintain the HTS below its critical temperature. We foresee that due to the innovation of new HTS material, as the critical temperature of the HTS becomes higher than the ambient temperature for the satellite orbits, the cryo-cooler will not be needed in our design.

This type of momentum wheel will outperform the momentum wheels that use non-lubricated ball bearings or active magnetic bearings. Its performance includes:

1. Ultra-low friction: energy loss rate is less than 50 mW;
2. Maintenance free: HTS superconducting bearing provides a stable levitation and the YBCO retains its material property in vacuum and low temperature virtually forever;

3. Ruggedness: performs well in low temperatures, vacuum and requires no lubricants;
4. Low power consumption: since the bearing is passive, it will not need any additional active control box which is often bulky and consumes considerable amount of energy.

As an example, below is the description of a possible configuration of a superconducting levitated momentum wheel:

Weight:
   Flywheel: Weight 1.25 kg
   Housing: 1 kg (approximate)
   Cryo-cooler: 0.5 kg
   Electronic: 0.5 kg (approx.)

Size:
   Housing: 6.0" diameter, 4" thick.
   Wheel (inside the housing): 5" diameter, 2" thick
   Cryo-cooler: 3" diameter, 4" long
   Controller and electronics: 3"×3"×2" box Moment of inertia:
   (Flywheel only): 0.0025 kg-m$^2$ Working Temperature:
   HTS bearing temperature below 70 K.

Power consumption:
   Static power consumption:
     Due to bearing loss: <100 mW@13,000 RPM
       (The above number can be reduced to 1 mW by using magnets with high uniformity.)
     Due to heat leak over 80 degrees temperature difference: around 1 mW.
   Dynamic Power Consumption:
     Cryo-cooler: 3.5 W to produce a 0.15 W cooling power at 77 K, used only when needed.

Maximum Angular Momentum Produced:
   At least 3.5-Joule Sec, but higher angular momentums are possible by rotating faster 20 Js can be accomplished using similarly designed devices.

To understand the value of a superconducting levitated momentum wheel, we must first investigate the potential applications of a micro satellite. The momentum wheel, as an integrated part of the micro satellite, is the engineering bottleneck to the advance of mini satellite technology. Hence, if the superconducting levitation technology can be successfully applied to the design of momentum wheel, a micro satellite that is of low cost and easier to deploy will certainly advance the related technologies that rely ono the satellite systems. The satellites have been used in the following areas:
1. Science—space research
2. Defense system—spy satellite
3. Weather—monitor ocean temperatures, jet streams and so forth
4. G.P.S.—global position system, guidance
5. Telecommunication: TV, telephone, Internet
6. Personal information station—future market The impact of this research will be on all other categories also. We anticipate the usage of satellite in the 4 and 5 categories will grow dramatically due to the rapid growth of personal computer market and the popularity of Internet. As the information technology becomes more and more mature, the usage of satellite in communication will definitely increase. For one to say that every one will own a personal computer 20 years ago might sound a fantasy. However, PCs have become very popular and affordable. A PS-"Personal Satellite" as a personal workstation which handles all the personal information transmission may not be far fetched 15 years from now if not sooner.

If a micro and compact satellite can be developed, this will make a "personal satellite" available. This will give a tremendous boost of speed for the information super highway and the potential market value will be beyond calculations. The break through of the momentum wheel technology will contribute significantly to the advance of mini satellite manufacturing.

The invention will now first be described by reference to FIG. 1 which shows magnets in an axial arrangement, and FIG. 2(a), FIG. 2(b) and FIG. 2(c) which show magnets in a radial arrangement.

Referring now to FIG. 1 there is shown an axial gap design in which magnets 11 and 12 may be parts of a stator, and magnet 16 which may be part of a rotor. As shown, the rotor and stator magnet subsystems have opposite polarity and form a system having zero diagonal stiffness.

Figure 2A:
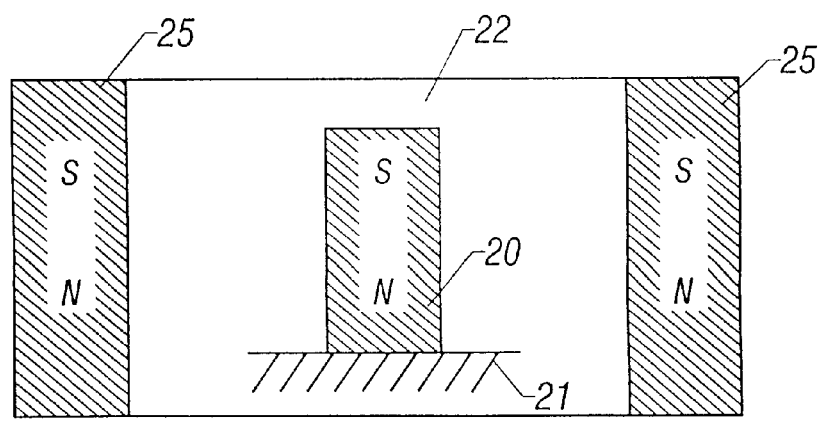
FIGS. 2(a), 2(b) and 2(c), illustrate a radial gap design core magnet 20 affixed to anchor 21, and donut-shaped ring magnet 25 having center hole 22, with core magnet positioned a various positions along the axial axis of core magnet 20, such as fully inside ring magnet 25 in FIG. 2(a), partially inside ring magnet 25 in FIG. 2(b), and completely outside of ring magnet 25 in FIG. 2(c).
Figure 2B:
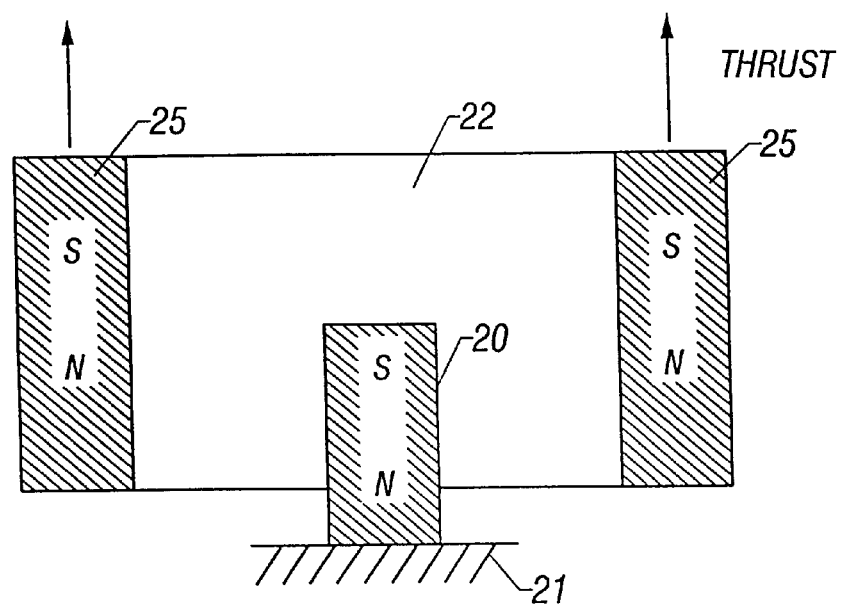
Figure 2C:
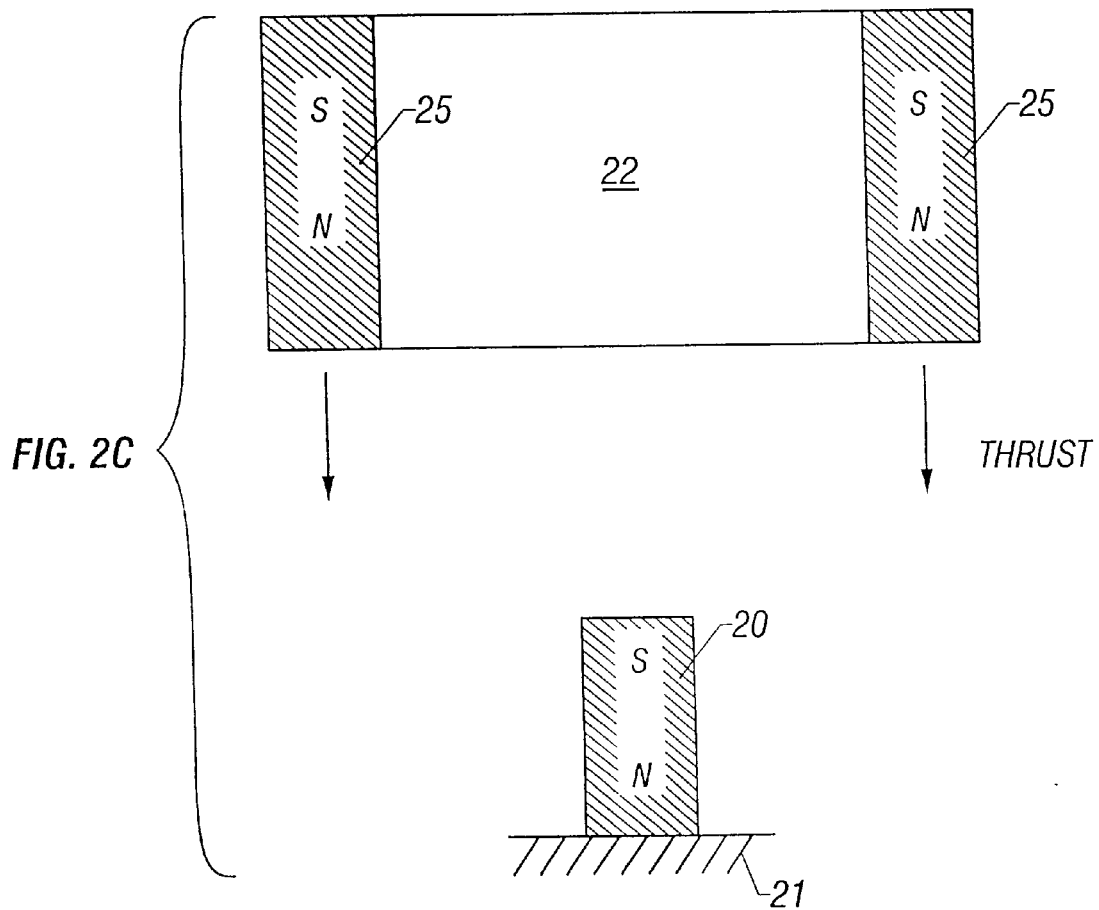

Referring now to FIGS. 2(a), 2(b) and 2(c), there is shown a radial gap design. In FIG. 2(a), core magnet 20 is affixed to anchor 21, and is surrounded by donut-shaped ring magnet 25 having center hole 22. As shown in FIG. 2(a), core magnet 20 and ring magnet 25 will be expelled apart with the slightest relative displacement of magnets 20 and 25. When the core magnet 20 is positioned away from ring magnet 25 along the cylindrical axis of ring magnet 25, core magnet 20 and ring magnet 25 are actually attracted to each other. Somewhere in between the magnet positions as shown in FIG. 2(a) and FIG. 2(c), such as that shown in FIG. 2(b), the magnetic system of the core magnet 20 and the ring magnet 25 are in a state of zero diagonal stiffness. The thrust provided by the magnet system is equal to the weight of the member carrying ring magnets 25.

Axial gap designs as shown in FIG. 1 can generally sustain a greater load than radial gap designs as shown in FIGS. 2(a)–2(c). However, axial gap designs are extremely difficult to utilize in practice, because there is only a very narrow margin in the positioning of the rotor magnet along the rotation axis in which the overall magnetic system is not violently unstable, beyond the capabilities of passive control from reasonable amounts of high temperature superconductors. In contrast, radial gap designs may be able to support only a more moderate load, but are much more forgiving in their tolerance in the axial position of the rotor magnet to attain zero diagonal stiffness.

In the practice of the present invention, it is possible to mix both axial gap and radial gap features in one design to achieve a suitable magnet system.

Figure 3:
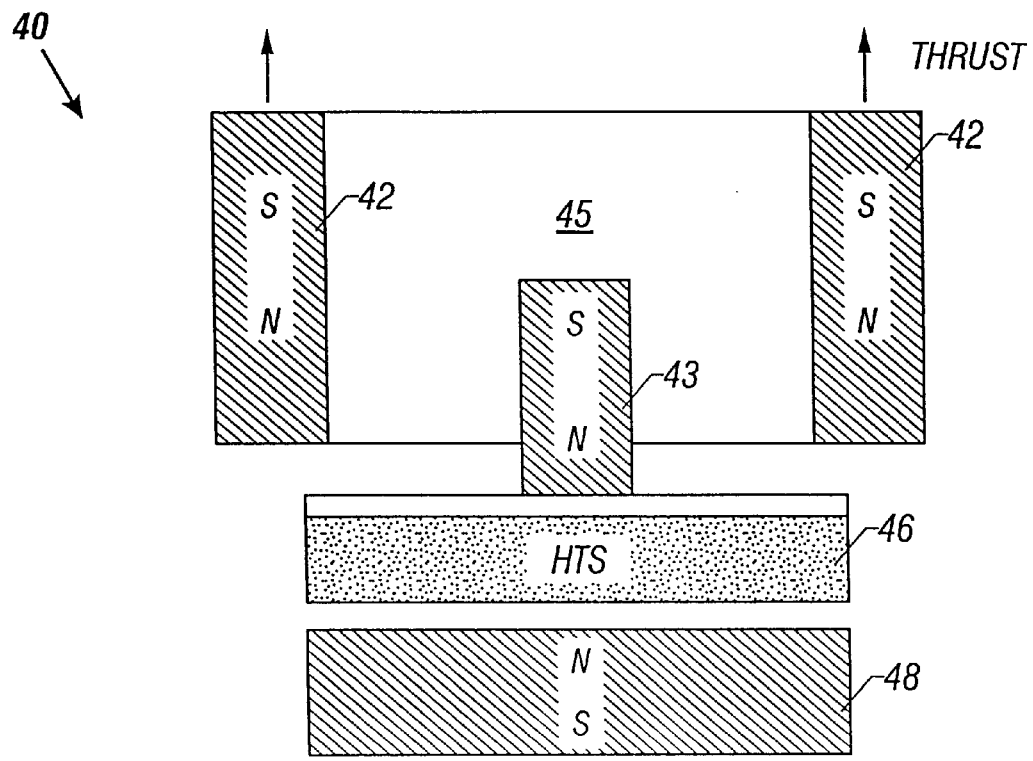
FIG. 3 is a schematic showing magnetic system 40 which includes radial gap features provided by ring-shaped magnet 42 defining hole 45, with cylindrical-shaped magnet 43 positioned within hole 45 surrounded by magnet 42, which includes axial gap features provided by magnet 48 acting upon magnet 42, and which includes HTS member 46 provided to improve the stability of the system.

For those rotating objects whose dimensions perpendicular to the rotation axis are greater than dimensions along the rotational axis, for example disc shaped, the design as shown in FIG. 3 would be utilized. As shown in FIG. 3, magnetic system 40 includes radial gap features provided by ring-shaped magnet 42 defining hole 45, with cylindrical-shaped magnet 43 positioned within hole 45 surrounded by magnet 42. Axial gap features are provided by magnet 48 acting upon magnet 42. HTS member 46 is provided to improve the stability of the system.

It is to be understood that HTS materials could be provided for stability in any number of positions within and/or around magnet system 40, including between any two magnet members and/or beside any magnet members. For example, in additional to HTS material 46 as shown, an HTS sheath could be provided around magnet 43, or an HTS lining could be provided for the interior of ring magnet 42 within hole 45.

As an external field change is forced to propagate into an HTS sample, there will be a spatial region in which the flux remains unaffected by the varying field. The outermost affected region contains the induced current which circulates in a direction that opposes the change of field. Such resistance to field changes stabilizes magnet-magnet interactions, as manifested in stiffness, defined as the negative derivative of force with respect to displacement (or $k_{ij}=-\delta F_j/\delta x_i$); positive stiffness implies stability while negative stiffness reflects instability.

Positive stiffness in the axial direction is accompanied by a negative stiffness in the radial direction—a consequence connoted in Earnshaw's theorem as noted above. An optimal magnet configuration delivers high thrust but exhibits low stiffness. As it will be very unstable on one axis if the orthogonal axis is very stiff, low stiffness is a compromise between stability and instability along orthogonal directions. The rule of thumb is to reduce the negative stiffness to a level which can be overcome by the positive stiffness of the HTS and hence result in a positive net stiffness (stable levitation). There are two primary ways to implement an HTS bearing based on the cooling procedure applied to the HTS, i.e., field cooling and zero-field-cooling.

One is to use permanent magnets brought against a zero-field-cooled (ZFC) HTS to achieve the thrust. In this scenario, due to the flux density gradient within the sample, flux lines may tend to force themselves into the sample, causing energy dissipation and reduction in $J_c$. Force drifts would then follow. Meanwhile, cooling the HTS in zero field requires the magnets to be separated from the HTS before the cooling, adding to the complexity of mechanical design.

The other approach is to use attractive or repulsive forces from permanent magnets to achieve suspension or levitation, and flux-pinning forces from the field-cooled HTS, placed in between the interacting magnets, to acquire stabilization. As the HTS material is cooled below $T_c$, the flux lines of the external field will be frozen inside the material and any subsequent change of the external field would be resisted by the HTS. Such system is less susceptible to flux creep because the differences between the external and internal fields are smaller. However, the HTS now would face an unstable system consisted of magnet pairs tending to either slip away or to crash into each other. Fortunately, with the newly developed large-grain HTS, suppressing such instability has become more manageable. Axial stiffness as high as 20 N/mm has been measured on 1.5"-diameter×0.75" thick seeded-grown samples interacting with permanent magnets of similar dimensions. The hybrid superconducting magnetic bearing does not come without a shortcoming. Its relatively lower stiffness makes the tolerance towards temporal instability much narrower than that allowable for an active counterpart.

In application, magnet system 40 could be used to rotate a disc-shaped member around an axis, by making ring magnet 42 part of the disc-shaped member, with magnet 43 part of the shaft member.

Figure 4A:
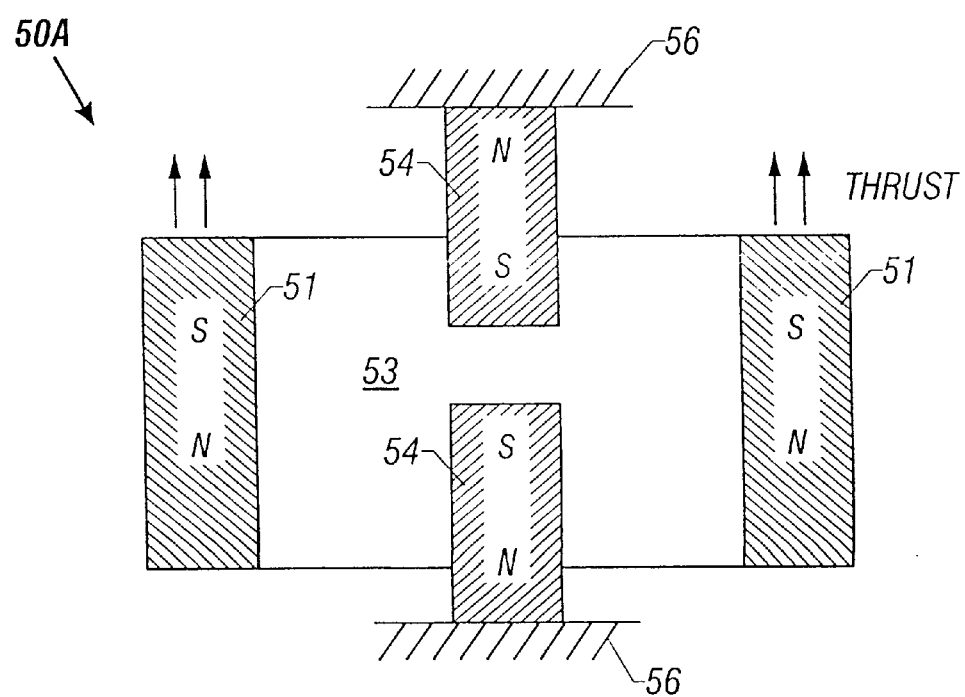
FIG. 4(a) shows magnetic system 50A, including radial gap features provided by ring magnet 51 defining hole 53, including cylindrical magnets 54 positioned partially within hole 53 and partially surrounded by ring magnet 51 as shown, to provide zero diagonal stiffness, and including anchor 56.
Figure 4B:
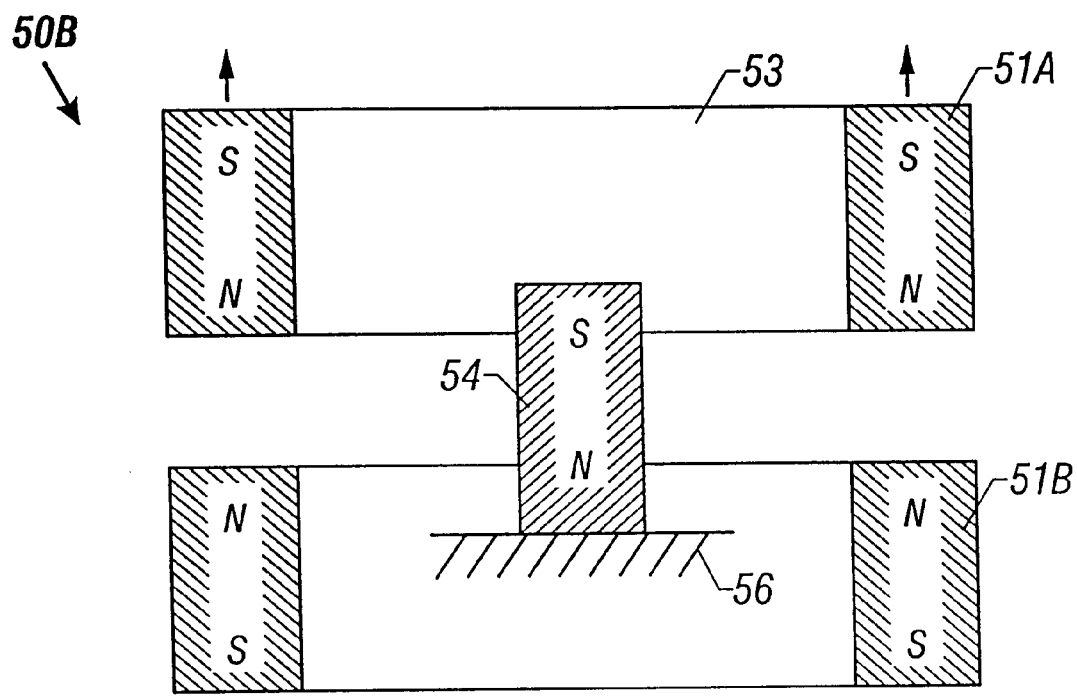
FIG. 4(*b*) shows a magnetic system 50B, including radial gap features provided by ring magnets 51A and 51B, including cylindrical magnet 54 with the ends of cylindrical magnet 54 positioned partially within hole 53 of each ring magnet 51A and 51B as shown, to provide zero diagonal stiffness, and including anchors 56.

For those rotating objects whose dimensions along the rotation axis are greater than dimensions across and which consequently have a tendency to topple, for example, cigar or elongated-shaped, the designs as shown in FIGS. 4(*a*) or 4(*b*) can be utilized.

As shown in FIG. 4(*a*), magnetic system 50A includes radial gap features provided by ring magnet 51 defining hole 53, and cylindrical magnets 54 which are each affixed to an anchor 56, which anchors may be connected or independent. Cylindrical magnets 54 are positioned partially within hole 53 and partially surrounded by ring magnet 51 as shown, to provide zero stiffness. The thrust provided by magnet system 50A is great enough to levitate ring magnet 51 and any structure to which it is connected.

A slight variation of the design of FIG. 4(*a*) is shown in FIG. 4(*b*). As shown in FIG. 4(*b*), magnetic system 50B includes radial gap features provided by ring magnets 51A and 51B, and cylindrical magnet 54 affixed to anchor 56. One end of cylindrical magnet 54 is positioned partially within hole 53 of each ring magnet 51A and 51B as shown, to provide zero stiffness. The thrust of system 50B is great enough to levitate ring magnet 51A and any structure to which it is attached.

It is to be understood that HTS materials could be provided for stability in any number of positions within and/or around magnet systems 51A or 51B, including between any two magnet members and/or beside any magnet members. Suitable methods of providing stability utilizing superconductors is disclosed in U.S. Pat. No. 5,159,219, issued Oct. 27, 1992 to Chu et al., herein incorporated by reference. For example, an HTS sheath could be provided around the ring magnets 54, or an HTS lining could be provided for the interior of ring magnets 51, 51A and/or 51B, within hole 53. Again, either zero-field-cooled or field-cooled superconductors could be utilized.

In the practice of the present invention, cooling of the superconducting materials may be provided by, but not limited to the use of liquid nitrogen or helium. The low temperature required for the superconductors to function are readily accessible with cryo-coolers of all sorts. In some cases, the superconductors are used in an environment that is naturally cool enough, such as the lunar surface, or in space. In other cases, the superconductors are used in association with equipment that is already cooled to liquid nitrogen temperatures or below for independent reasons, such as with infrared sensors, or in cryo-pumps.

The flywheel system of the present invention can be utilized in a broad range of applications, generally for energy storage/retrieval systems. Specific applications in which the present invention may be utilized include angular momentum reaction wheels for spacecraft attitude control, flywheels for energy storage in electric vehicles, large flywheels for power utility energy storage, energy storage for pulsed power application in laser devices, and backup power storage flywheels for critical computer systems.

Flywheel systems of the present invention in the small to medium size, that is 1 Whr to 1 kWhr, may be used in uninterruptible power systems, or for power quality control. Medium to large size flywheel system, those in the range of a few kWhr to 10 MWhr can be used for 24 hour period (diurnal cycle) utility load management, and also for extending the capability of renewable generation capacity devices, such as windmills, solar, etc.

The rotational platform embodiment of the present invention may be utilized to mount almost any type of equipment or instrumentation.

Figure 16A:
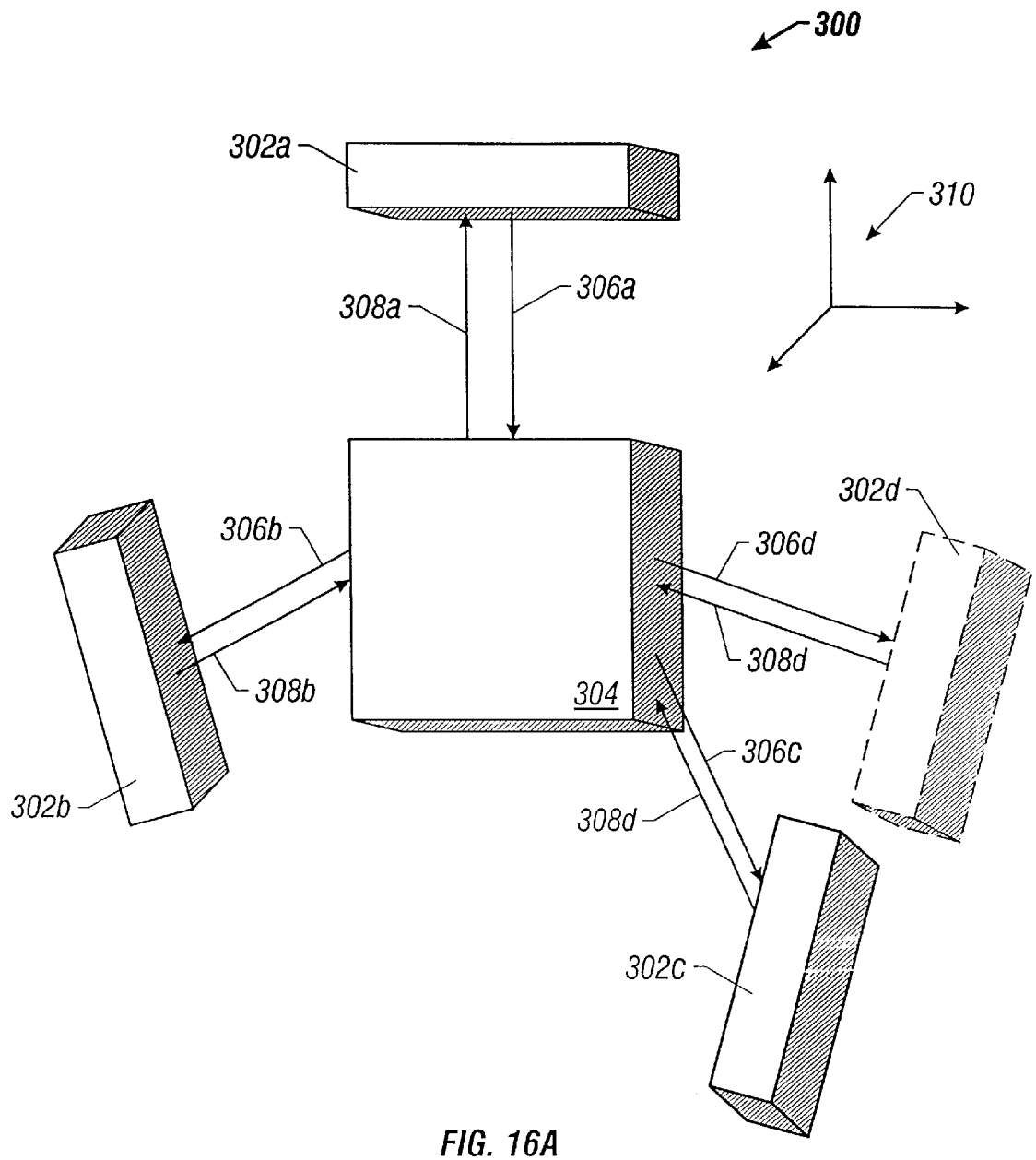
FIG. 16(*a*) depicts a gyroscope momentum exchange system having tetrahedrally arranged HTS momentum wheels coupled to a centrally located cryo-cooler.

Referring now to FIGS. 16(*a*) and 16(*b*), two gyro-based momentum guidance systems using different arrangements of momentum wheels of the present invention. FIG. 16(*a*) depicts a system 300 including four momentum wheels 302*a–d* positioned at corners of a tetrahedron (not shown). Each wheel 302 is connected to a centrally located cryocooler 304 with coolant supply lines 306*a–d* and return lines 308*a–d* so that coolant can be circulated into and through the HTS components in each momentum wheel. Each wheel 302 is oriented with its spin axis coincident with a line directed to the center of the tetrahedron. The wheels 302*c* and 302*d* are positioned above and below the plain of the paper in FIG. 16(*a*). Of course, the system 300 also includes a electronic system that can change the relative spin rate of one or more of the momentum wheels 302 and, thus, change the resultant angular momentum acting on a body having the guidance system 300 mounted thereon or therein. Changing the wheel speed of one or more of the wheels 302 will change the resulting angular momentum vector (magnitude and direction) causing the body to change its relative position. If the body is a satellite, then the change in angular momentum vector will result in a change of spin and spin orientation. Such changes can be used to change the relative pointing of the satellite, e.g., maintain nadir pointing or maintain solar panel alignment with the sun during orbital precession. Although the present arrangement uses four wheels, usually only three wheels are necessary to adequately define and change spin axis orientation in an orthogonal, 3D coordinate system such as the coordinate system 310 shown in FIG. 16(a).

Figure 16B:
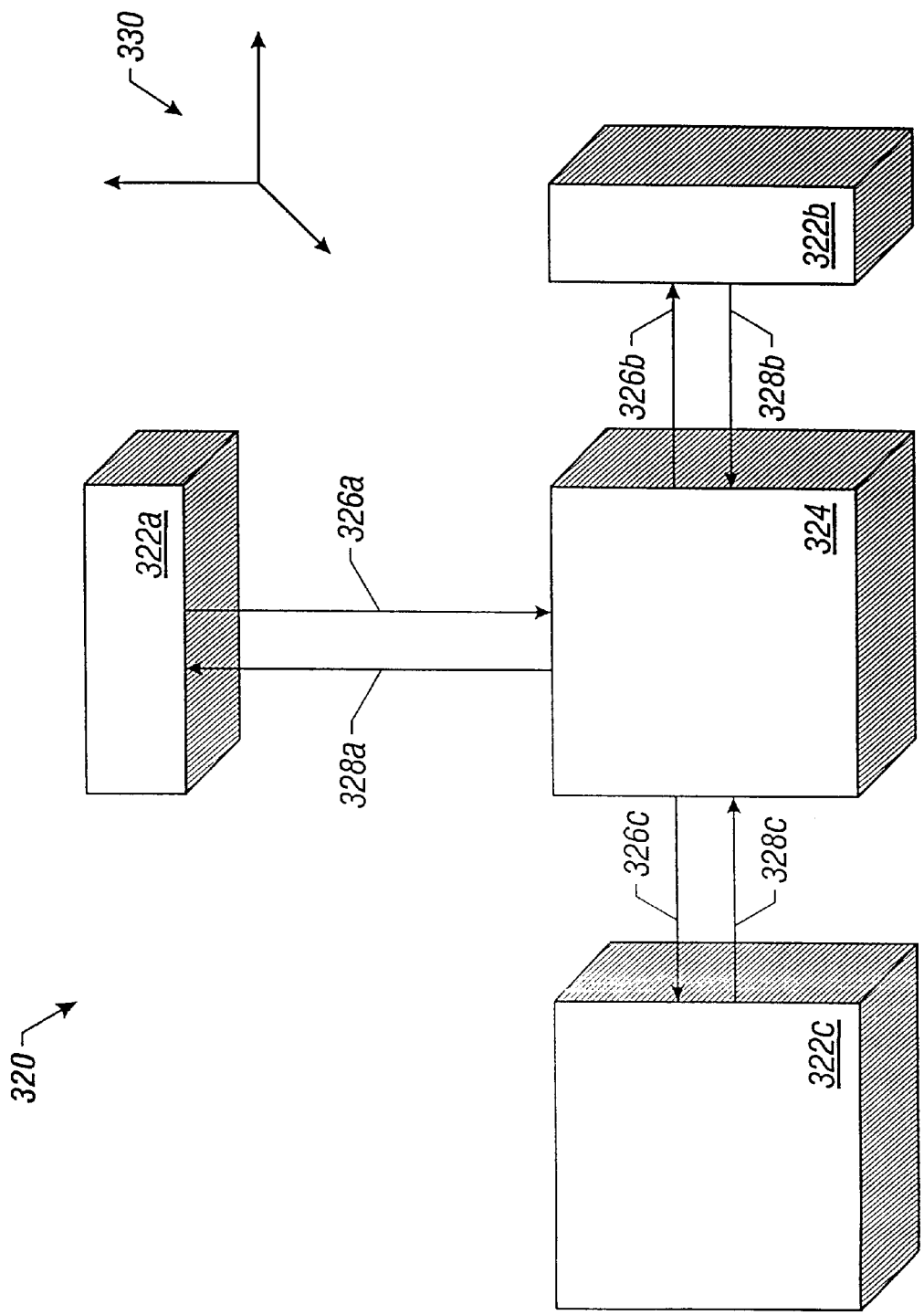

FIG. 16(b) depicts a second system 320 including three momentum wheels 322a–c positioned at corners of a tetrahedron (not shown). Each wheel 322 is connected to a centrally located cryo-cooler 324 with coolant supply lines 326a–c and return lines 328a–c so that coolant can be circulated into and through the HTS components in each momentum wheel. For space-based vehicles, the cryo-coolers use helium as the coolant; however, earth-based vehicles, the cryo-coolers can use other coolants such as nitrogen, air, or the like provided, of course, that the cooler can maintain the HTS materials used at and preferably below their critical temperature. The three wheels in this arrangement directly form an orthogonal coordinate system as shown in FIG. 16(b). As with the wheel arrangement shown in FIG. 16(a), this system also include a electronic control system which includes individual wheel control sub-systems which ensure that each wheel maintains a given spin rate within a given tolerance and a overall control sub-system for setting and changing the relative spin of the three momentum wheels. Again, changing the relative spin on each wheel changes the angular momentum vector associated with the arrangement and thereby the angular momentum of the body or vehicle in which it is incorporated. The three wheels are arranged so that their spin axes form an orthogonal, 3D coordinate system such as the coordinate system 330 shown in FIG. 16(a).

The following configuration of momentum wheels are only two examples of numerous configurations of momentums wheels that could be used to control the attitude and orientation of a vehicle such as a satellite. Moreover, one or more momentum wheel can be used in certain application to accomplish attitude and orientation control.

Although two arrangements of momentum storage devices for use in controlling the attitude of a vehicle either in space or otherwise, the exact configuration of the momentum storage devices is not critical provided that the configuration is capable of creating an angular momentum that will result in proper vehicle control. Other configurations are disclosed in U.S. Pat. Nos.: 5,826,829, 5,308,024, 5,279,483, 5,248,118, 5,205,518, 5,201,833, 5,058,835, 4,916,622, 4,230,294, 4,084,772, 4,071,211, 3,999,729, 3,940,096, and 3,591,108, incorporated herein by reference and each of these configurations can be used in combination with the HTS momentum storage devices of the present invention to lower the weight of the control systems.

Figure 17:
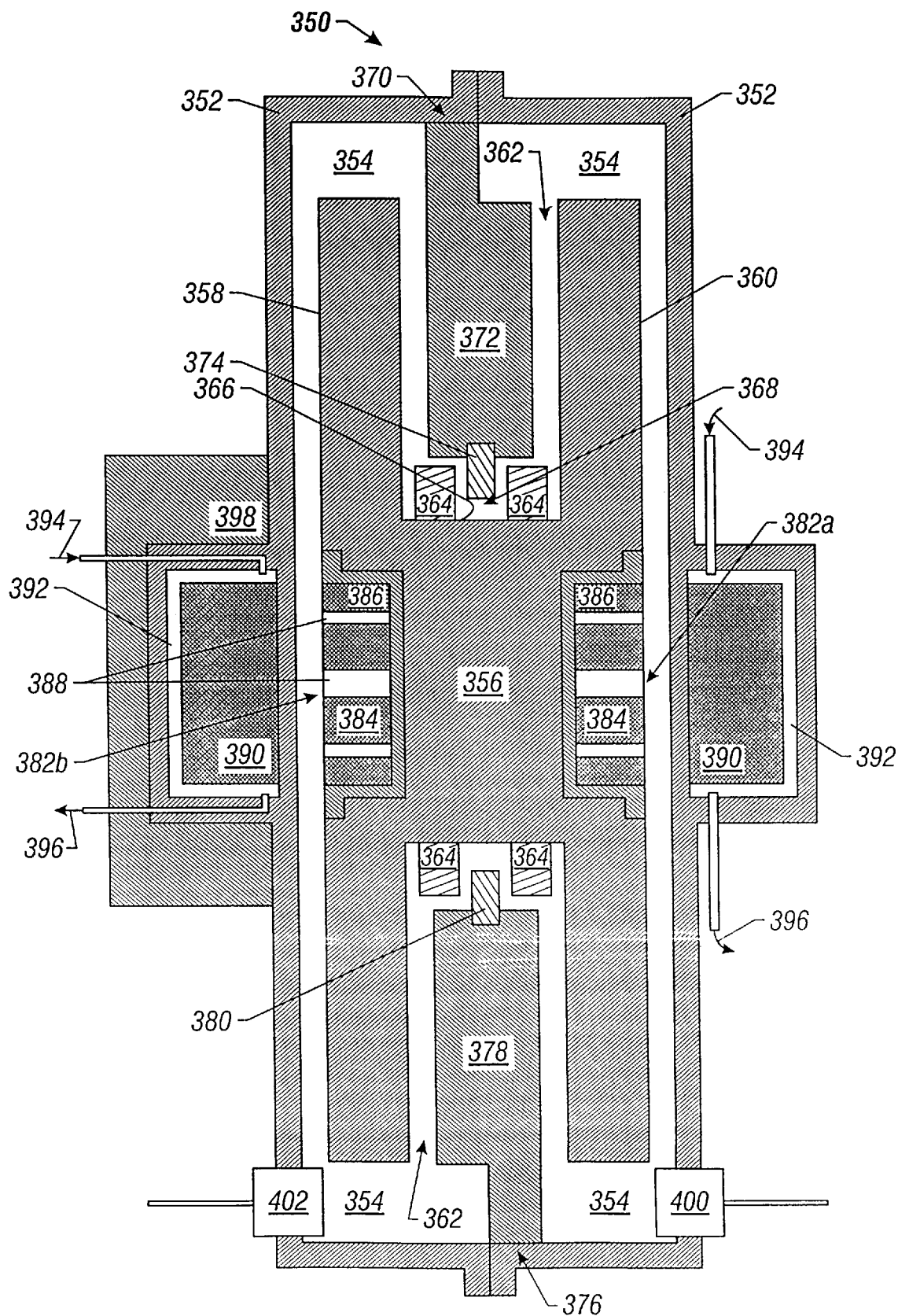
FIG. 17 is a cross-sectional view of a first embodiment of an HTS momentum wheel of the present invention.

Referring now to FIG. 17, a first embodiment of an HTS momentum wheel 350 of the present invention is shown which includes a housing 352 surrounding an interior 354 which contain internal components of the wheel 352. The internal components include a momentum disk or flywheel 356. The flywheel 356 is cylindrically symmetric and generally I-shaped having a first outer surface 358 and a second outer surface 360. The I-shaped flywheel 356 also includes a central open region 362. Within the open region 362 of the flywheel 356, the wheel 350 also includes two radial bearings 364 attached to an inner wall 366 of the open region 362 and positioned on the wall 366 to form a centered gap 368 between the two radial bearings 364. Attached to a first side portion 370 of the housing 352 is a first arm rest 372 having a first touchdown bearing 374 associated therewith and attached to a second side portion 376 of the housing 352 is a second arm rest 378 having a second touchdown bearing 380. The touchdown bearings 374 and 380 protect the wheel from sudden losses of levitation and serve as a back up means for allowing disk rotation in case of a failure of the cryo-cooler which cools the superconductor components of the wheel 350.

Associated with each central region 382a–b of the outer surfaces 358 and 360 and extending into the disk 356 are an inner permanent ring magnet 384 and an outer permanent ring magnet 386. The two ring magnets are oppositely poled, i.e., one magnet is NS poled and the other is SN poled where the poles are directed along an axial direction of the magnets 384 and 386 or in a direction coincident with a spin axis of the flywheel. The ring magnets 384 and 386 are held in place by spacers 388. Positioned over each central region 382 are two HTS levitation devices 390. The levitation devices 390 are contained in coolant reservoirs 392 having a coolant inlet conduit 394 and a coolant outlet conduit 396. The conduits 394 and 396 allow coolant from the cryo-coolers to circulate through the reservoirs 392 and maintain the HTS material comprising the HTS levitation devices 390 at or below its $T_c$ temperature.

Finally, the momentum storage device 350 includes an magneto or electromagneto motor 398 which maintains or changes the spin rate of the flywheel 356. The wheel 350 is also generally hermetically sealed and equip with a vacuum line 400 to maintain the interior of the wheel under a reduced pressure which may be the ambient pressure of space. The wheel 350 also includes various sensors (not shown) designed to determine disk spin rate, motor acceleration, disk stability, the temperature in the HTS levitation components and other sensors well-known in the art. Additionally, the wheel 350 also includes a hermetically sealing connector 402 which places the wheel motor and sensors in electrical communication with a control system to be described herein. The motor 398 is activated and deactivated by routines associated with an on-board computer to be described more fully below which takes information from the wheel 350 and from other sensors such as sun sensors, gyros, star trackers, coarse sensors, magnetometer, bright object sensors and the like and commands from operators to maintain and/or change orientation of the vehicle to which the wheel 350 is attached.

Figure 18:
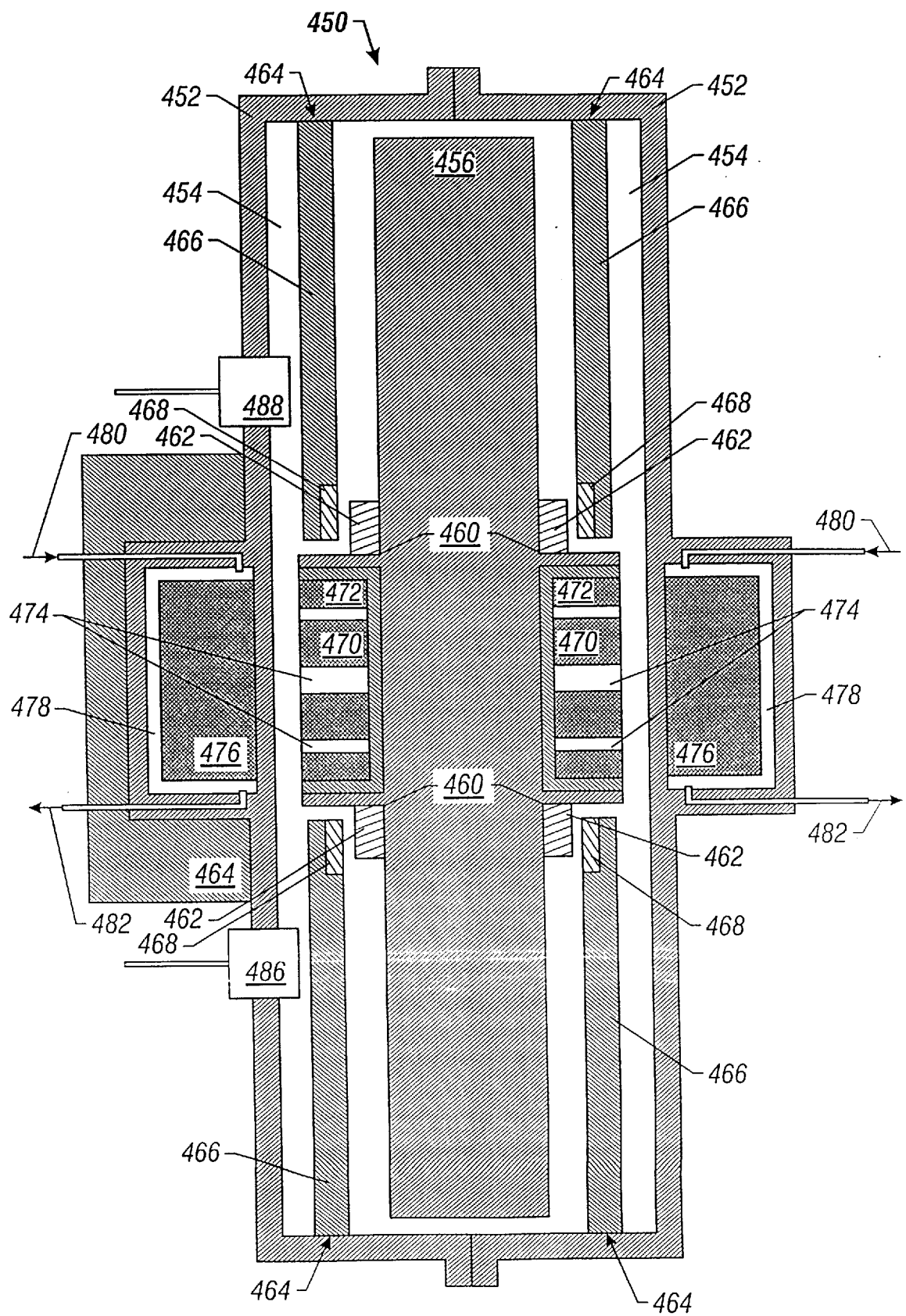
FIG. 18 is a cross-sectional view of a second embodiment of an HTS momentum wheel of the present invention.

Referring now to FIG. 18, a second embodiment of an HTS momentum wheel 450 of the present invention is shown which includes a housing 452 surrounding an interior 454 which contain internal components of the wheel 452. The internal components include a momentum disk or flywheel 456. The flywheel 456 is cylindrically symmetric and generally bar-shaped having two centrally located raised portions 458a–b. Located at all four corners 460 are radial bearings 462. Attached at four locations 464 on the housing 452 are arms 466 having touchdown bearings 468 associated therewith designed to engage the radial bearings 462. The touchdown bearings 468 protect the wheel from sudden losses of levitation and serve as a back up means for allowing disk rotation in case of a failure of the cryo-cooler which cools the superconductor components of the wheel 450.

Associated with each raised central portions 458a–b of the disk 452 are an inner permanent ring magnet 470 and an outer permanent ring magnet 472. The two ring magnets are oppositely poled, i.e., one magnet is NS poled and the other is SN poled where the poles are directed along an axial direction of the ring magnets 470 and 472. The ring magnets 470 and 472 are held in place by spacers 474. Positioned over each raised portion 458 are two HTS levitation devices 476. The levitation devices 476 are contained in coolant reservoirs 478 having a coolant inlet conduit 480 and a coolant outlet conduit 482. The conduits 480 and 482 allow coolant from the cryo-coolers to circulate through the reservoirs 478 and maintain the HTS material comprising the HTS levitation devices 476 at or below its $T_c$ temperature.

Finally, the momentum storage device 450 includes an magneto or electromagneto motor 484 which maintains or changes the spin rate of the flywheel 456. The wheel 450 is also generally hermetically sealed and equip with a vacuum line 486 to maintain the interior of the wheel under a reduced pressure which may be the ambient pressure of space. The wheel 450 also includes various sensors (not shown) designed to determine disk spin rate, motor acceleration, disk stability, the temperature in the HTS levitation components and other sensors well-known in the art. Additionally, the wheel 450 also includes a hermetically sealing connector 488 which places the wheel motor and sensors in electrical communication with a control system to be described herein.

Figure 19:
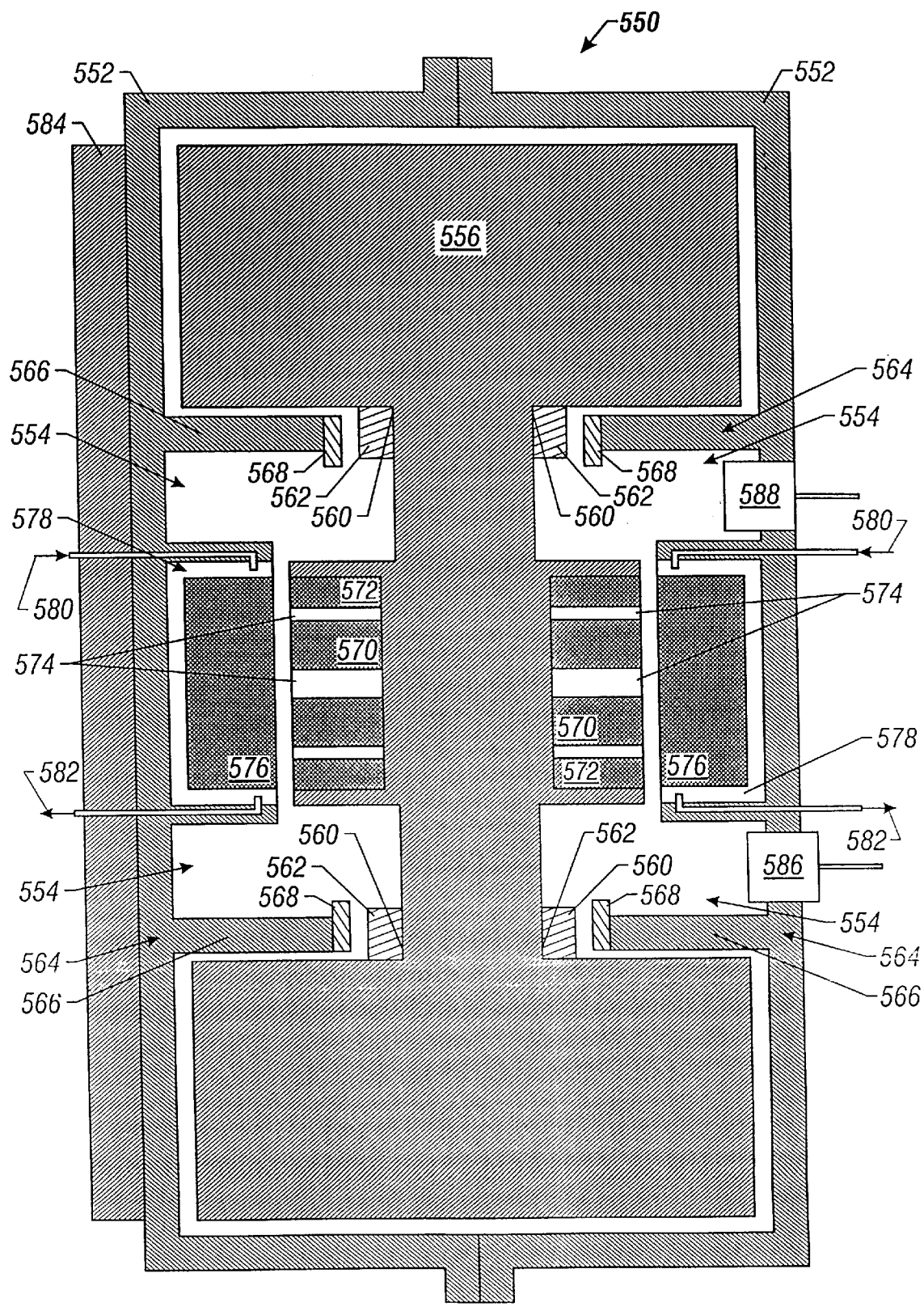
FIG. 19 is a cross-sectional view of a third embodiment of an HTS momentum wheel of the present invention.

Referring now to FIG. 19, a third embodiment of an HTS momentum wheel 550 of the present invention is shown which includes a housing 552 surrounding an interior 554 which contain internal components of the wheel 552. The internal components include a momentum disk or flywheel 556. The flywheel 556 is cylindrically symmetric and generally dumbbell-shaped having two centrally located raised portions 558a–b. Located at all four outer corners 560 are radial bearings 562. Attached at four locations 564 on the housing 552 are arms 566 having touchdown bearings 568 associated therewith designed to engage the radial bearings 562. The touchdown bearings 568 protect the wheel from sudden losses of levitation and serve as a back up means for allowing disk rotation in case of a failure of the cryo-cooler which cools the superconductor components of the wheel 550.

Associated with each raised central portions 558a–b of the disk 552 are an inner permanent ring magnet 570 and an outer permanent ring magnet 572. The two ring magnets are oppositely poled, i.e., one magnet is NS poled and the other is SN poled where the poles are directed along an axial direction of the ring magnets 570 and 572. The ring magnets 570 and 572 are held in place by spacers 574. Positioned over each raised portion 558 are two HTS levitation devices 576. The levitation devices 576 are contained in coolant reservoirs 578 having a coolant inlet conduit 580 and a coolant outlet conduit 582. The conduits 580 and 582 allow coolant from the cryo-coolers to circulate through the reservoirs 578 and maintain the HTS material comprising the HTS levitation devices 576 at or below its $T_c$ temperature.

Finally, the momentum storage device 550 includes an magneto or electromagneto motor 584 which maintains or changes the spin rate of the flywheel 556. The wheel 550 is also generally hermetically sealed and equip with a vacuum line 586 to maintain the interior of the wheel under a reduced pressure which may be the ambient pressure of space. The wheel 550 also includes various sensors (not shown) designed to determine disk spin rate, motor acceleration, disk stability, the temperature in the HTS levitation components and other sensors well-known in the art. Additionally, the wheel 550 also includes a hermetically sealing connector 588 which places the wheel motor and sensors in electrical communication with a control system to be described herein.

Figure 20:
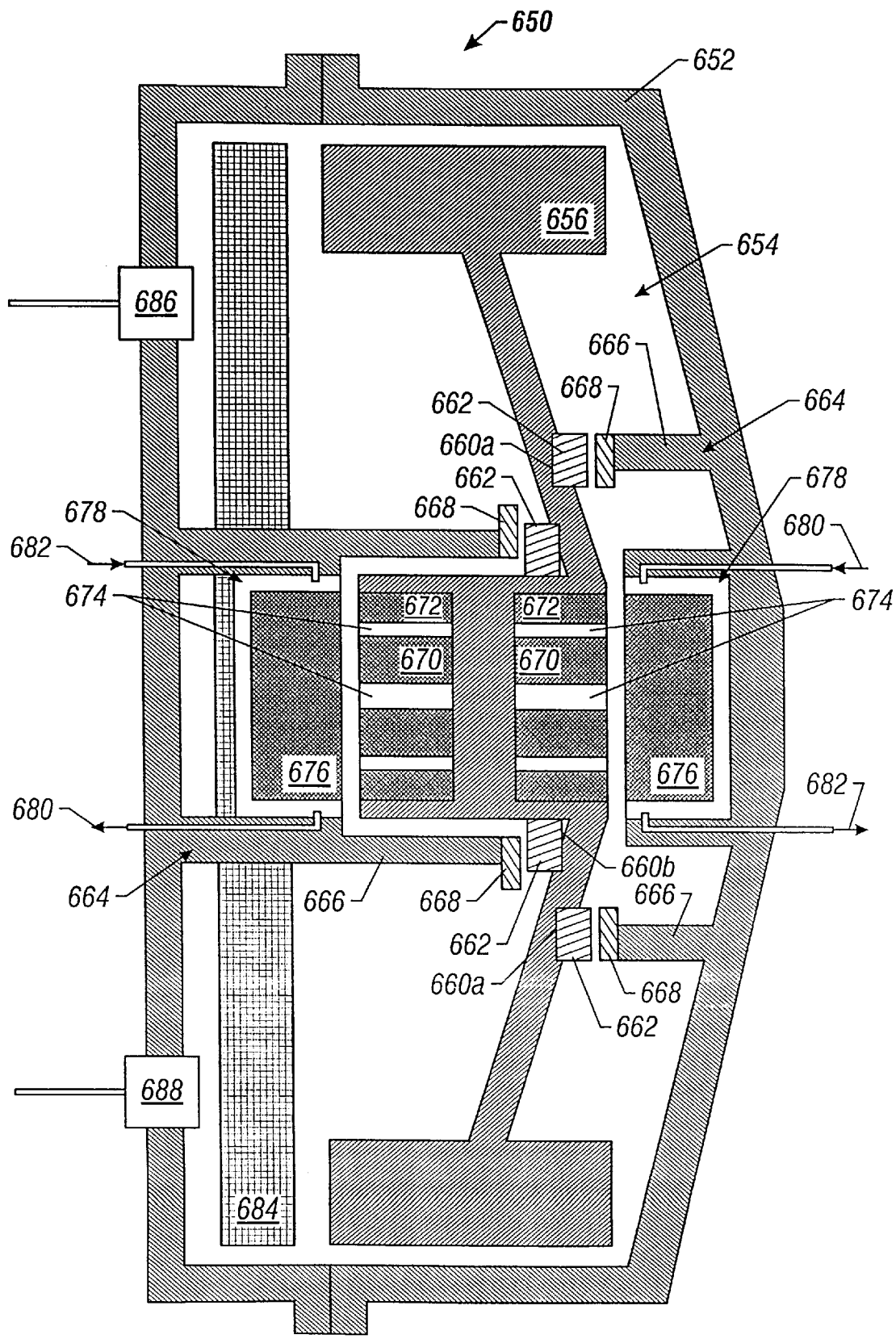
FIG. 20 is a cross-sectional view of a fourth embodiment of an HTS momentum wheel of the present invention.

Referring now to FIG. 20, a forth embodiment of an HTS momentum wheel 650 of the present invention is shown which includes a housing 652 surrounding an interior 654 which contain internal components of the wheel 652. The internal components include a momentum disk or flywheel 656. The flywheel 656 is cylindrically symmetric, cantilever-shaped having two centrally located raised portions 658a–b. Located at upper and lower locations 660a–b are radial bearings 662. Attached at four locations 664 on the housing 652 are arms 666 having touchdown bearings 668 associated therewith designed to engage the radial bearings 662. The touchdown bearings 668 protect the wheel from sudden losses of levitation and serve as a back up means for allowing disk rotation in case of a failure of the cryo-cooler which cools the superconductor components of the wheel 650.

Associated with each raised central portions 658a–b of the disk 652 are an inner permanent ring magnet 670 and an outer permanent ring magnet 672. The two ring magnets are oppositely poled, i.e., one magnet is NS poled and the other is SN poled where the poles are directed along an axial direction of the ring magnets 670 and 672. The ring magnets 670 and 672 are held in place by spacers 674. Positioned over each raised portion 658 are two HTS levitation devices 676. The levitation devices 676 are contained in coolant reservoirs 678 having a coolant inlet conduit 680 and a coolant outlet conduit 682. The conduits 680 and 682 allow coolant from the cryo-coolers to circulate through the reservoirs 678 and maintain the HTS material comprising the HTS levitation devices 676 at or below its $T_c$ temperature.

Finally, the momentum storage device 650 includes an magneto or electromagneto motor 684 which maintains or changes the spin rate of the flywheel 656. The wheel 650 is also generally hermetically sealed and equip with a vacuum line 686 to maintain the interior of the wheel under a reduced pressure which may be the ambient pressure of space. The wheel 650 also includes various sensors (not shown) designed to determine disk spin rate, motor acceleration, disk stability, the temperature in the HTS levitation components and other sensors well-known in the art. Additionally, the wheel 650 also includes a hermetically sealing connector 688 which places the wheel motor and sensors in electrical communication with a control system to be described herein.

Although the above embodiments include two oppositely configured HTS levitation units and two centrally located permanent ring magnet pairs associated with the flywheel, the momentum wheels of the present invention can be constructed with a single HTS levitation unit and a single magnet on the flywheel. The flywheel magnet can be a single axially disposed permanent or electromagnet associated with the flywheel or a combination of ring magnets provided that the resulting magnets field poles are all aligned with the axis of rotation. The levitation and flywheel magnets can also include smaller shimming magnetic or coils to finely adjust levitation parameters such as equilibrium gap distance (distance between the HTS element surface and the flywheel surface) or the position of the flywheel relative to the center of the HTS element as is well-known in the art.

Figure 21:
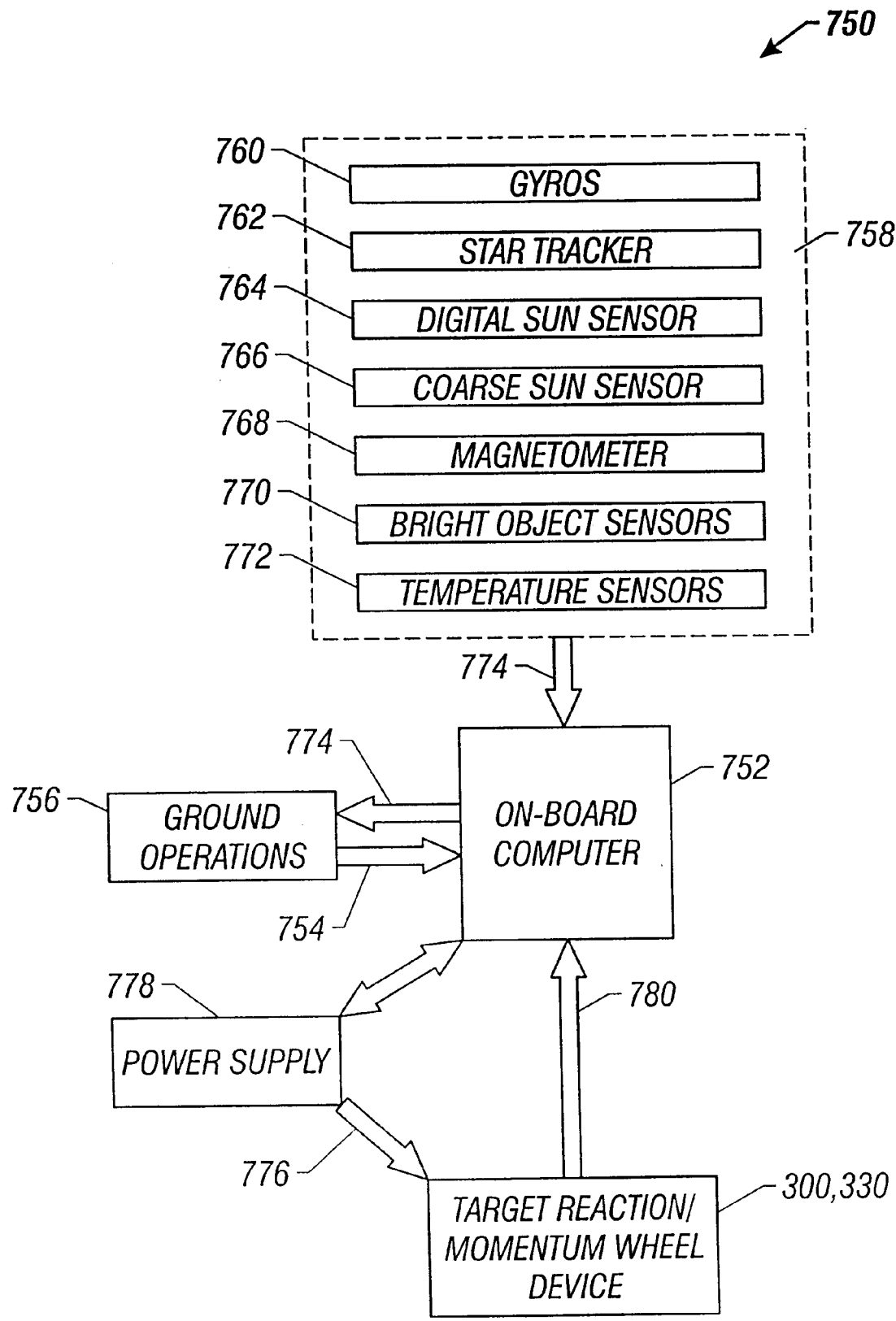
FIG. 21 is a block diagram of a satellite attitude feedback control system.

Referring now to FIG. 21, the HTS momentum wheel devices shown generally in FIGS. 17–19 are used as an attitude control component in a feedback control system generally 750. The momentum wheels used individually or in combination such as those combinations depicted in FIGS. 16(a) and 16(b) are torque reaction/momentum control systems because changes in spin rate at any one device will change the torque acting on the vehicle on which the devices are installed resulting in a change in relative attitude and spin direction. Although a particular control system is described below, any control system can be used as well provided that the satellite or vehicle attitude and orientation can be maintained and/or altered at will. The control system 750 includes an on-board computer 752 designed to receive input commands 754 from ground operations 756. If the control system is part of a satellite, when the commands can include information to change the attitude of the satellite in order to aim the satellites scientific instruments, transmitters or receivers at a desired target. The system can also include a number of sensors 758 including, without limitation, a gyroscope 760, a star tracker 762, digital sun sensors 764, coarse sun sensors 766, magnetometers 768, bright object sensors 770 and temperature sensors 772. These sensors 758 feed data 774 to the computer 752 to indicate the position and attitude of the satellite. The data 774 is also transmitted from the satellite to the ground operations 756.

When the computer 752 receives input commands 754 to change attitude, the computer 752 computes a new spin rate (momentum or torque) for each HTS momentum wheel in the wheel configuration. The computer 752 then computes an amount of electric current 776 required by the motors associated with each wheel to change the spin rate of each momentum wheel which results in a change attitude corresponding to the commands 754. The current 776 is, of course, supplied to each motor by an external power supply 778 which is generally an array of solar panels, through hermetic connector. Sensors in each HTS momentum wheel such as Hall effect sensors or laser spin rate sensors sense the spin rate (rpm) and acceleration on the motor and forward information 780 to the computer 752 for processing. As the satellite changes attitude, the computer 752 will of course continually update the spin rate and current until the satellite is stable at its new attitude.

EXAMPLES

Example 1—Flywheel

Figure 5:
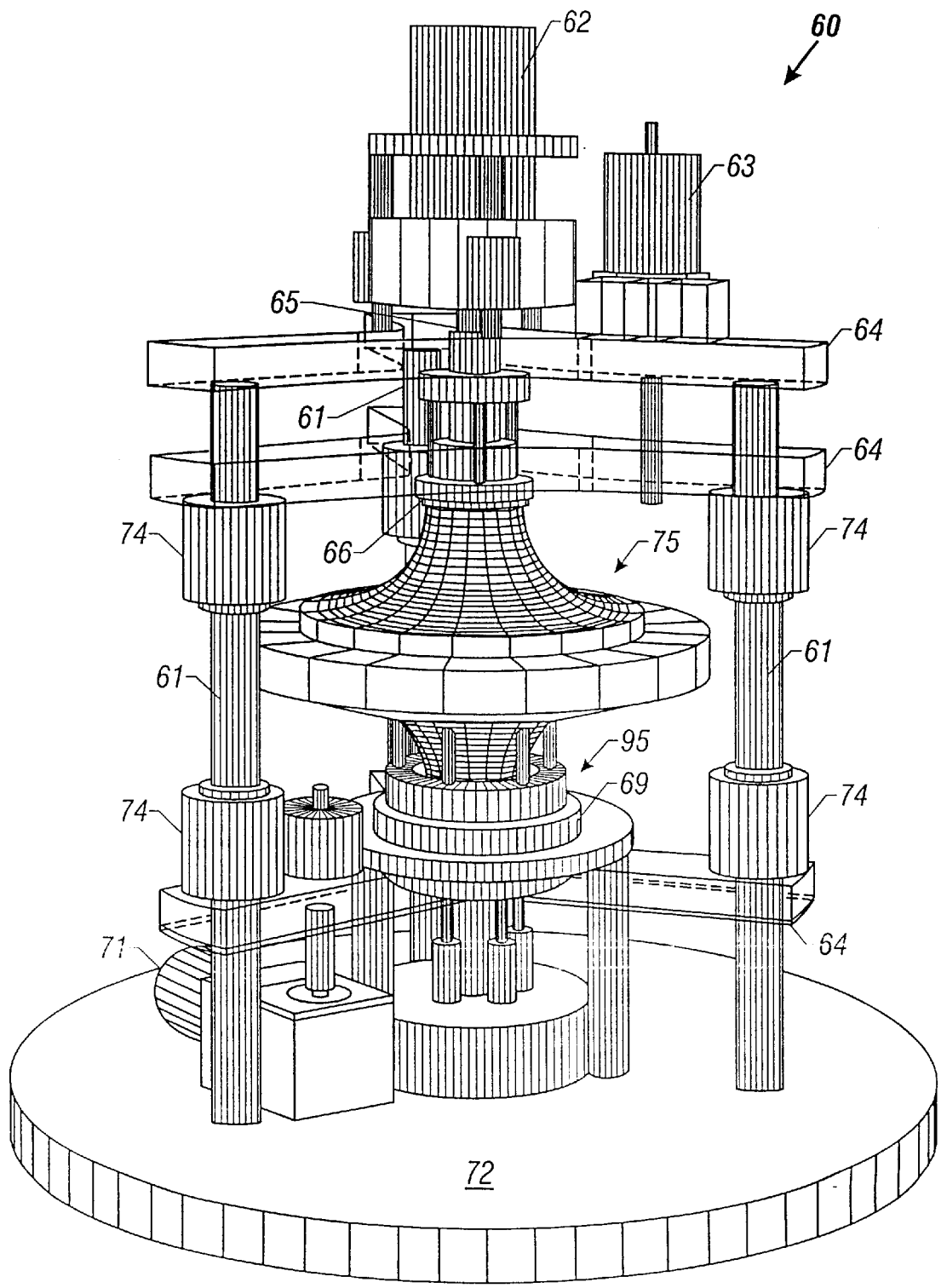
FIG. 5 is a drawing of flywheel system 60 showing flywheel 75, motor 62, stepper motor 63 for the top chamfer, stepper motor 71 for the bottom chamfer, rotor engaging switch 65, HTS cold stage 66, support posts 61, lateral supports 64, linear bearings 74 which allow movement of lateral supports 64 along support posts 61, HTS cold stage 69, cold stage 95, and base support plate 72.
Figure 6:
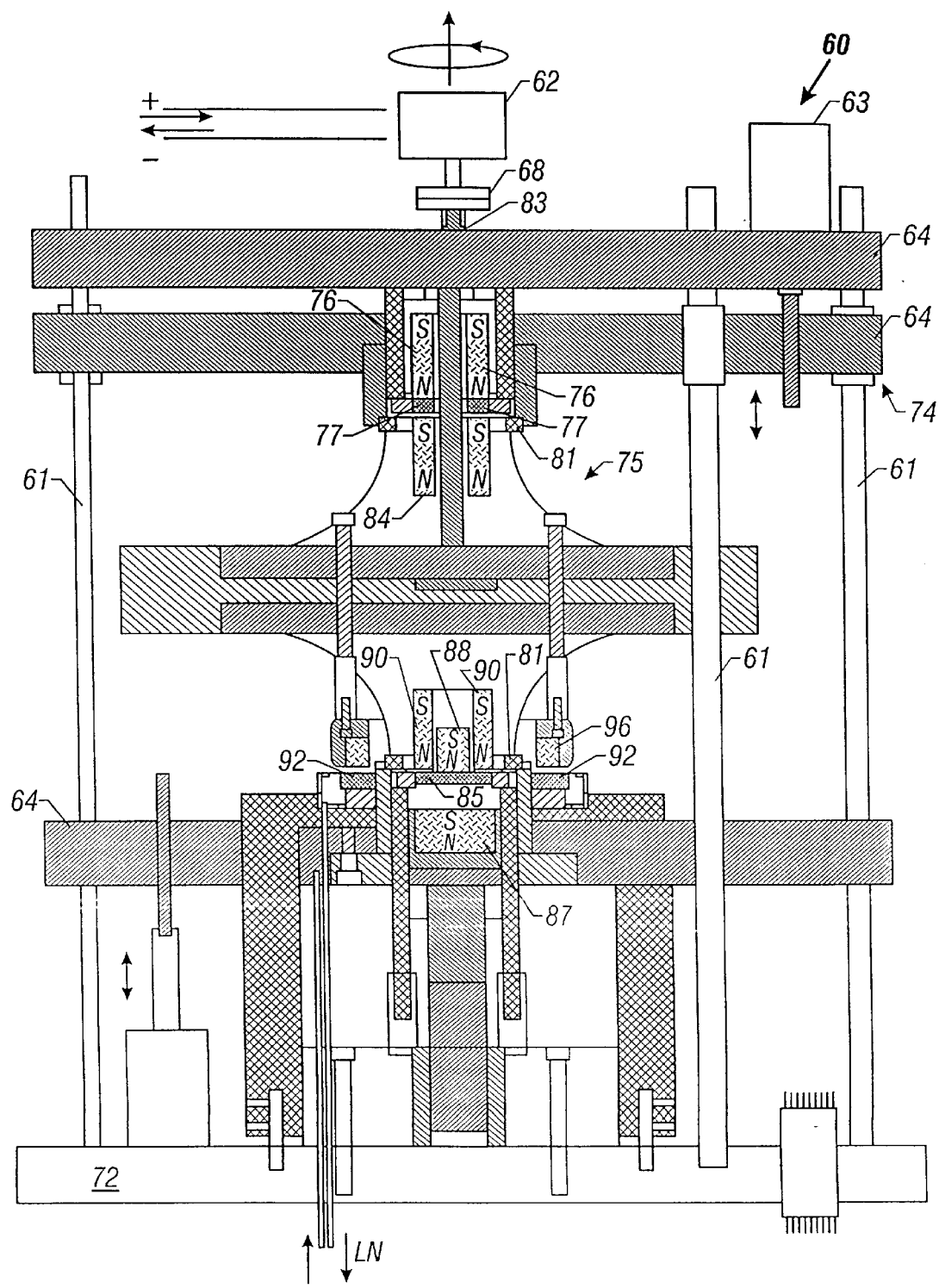
FIG. 6 is a partial cut-away of FIG. 5 showing the various magnets of flywheel system 60, including stator permanent ring magnet 76, stator HTS ring 77 cooled by cold stage 66, rotor permanent ring magnet 84, rotor assembly 75, rotor permanent ring magnet 90, stator permanent disc magnet 88, stator HTS disc 85 cooled by cold stage 69, and stator permanent disc magnet 87, and shown in FIG. 6, a stator ring of HTS discs 92 cooled by cold stage 95, and permanent rotor ring magnet 96.
Figure 7A:
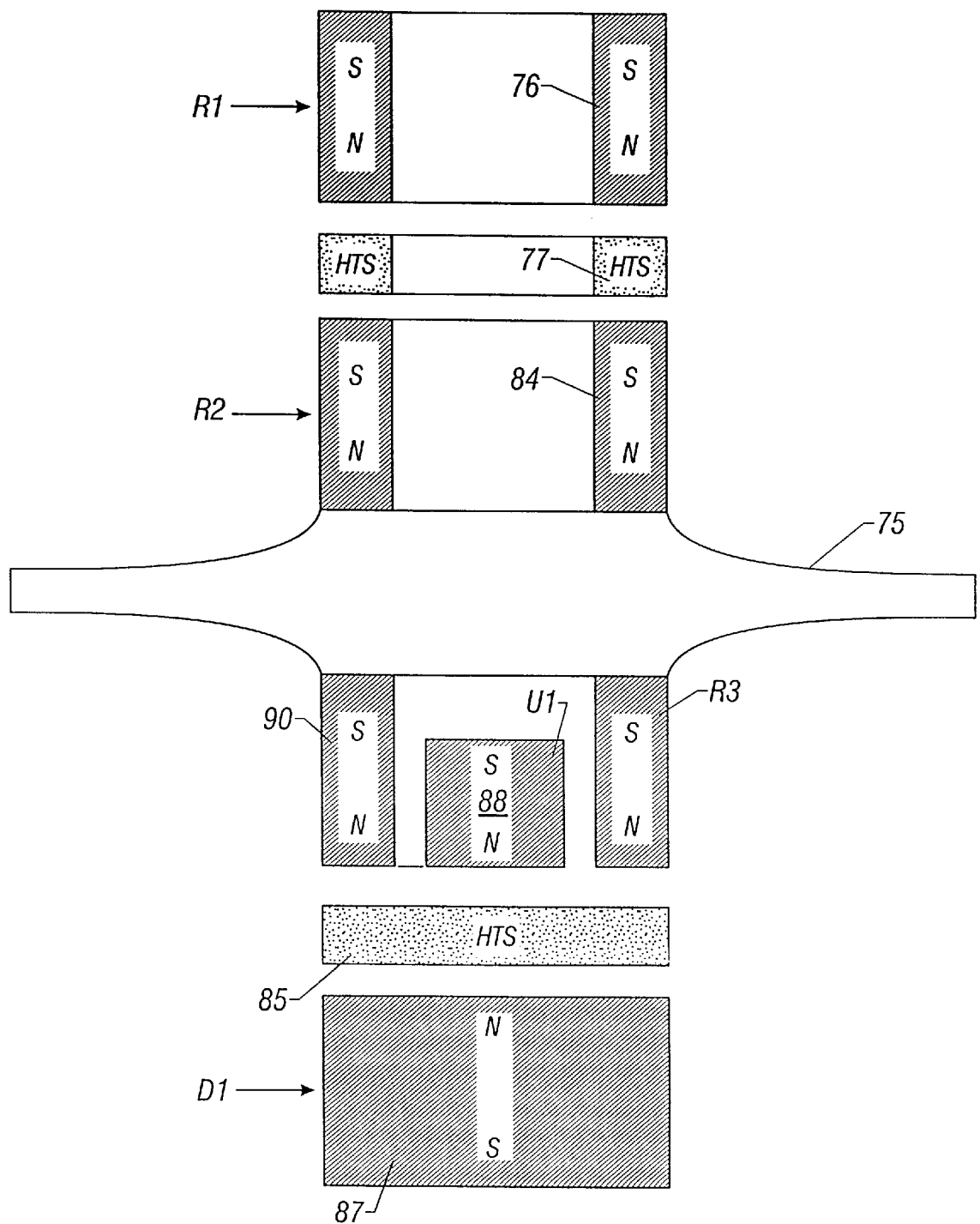
FIG. 7(*a*) is a schematic showing the various magnets of flywheel system 60, including stator permanent ring magnet 76, stator HTS ring 77 cooled by cold stage 66, rotor permanent ring magnet 84, rotor assembly 75, rotor permanent ring magnet 90, stator permanent disc magnet 88, stator HTS disc 85 cooled by cold stage 69, and stator permanent disc magnet 87.
Figure 7B:
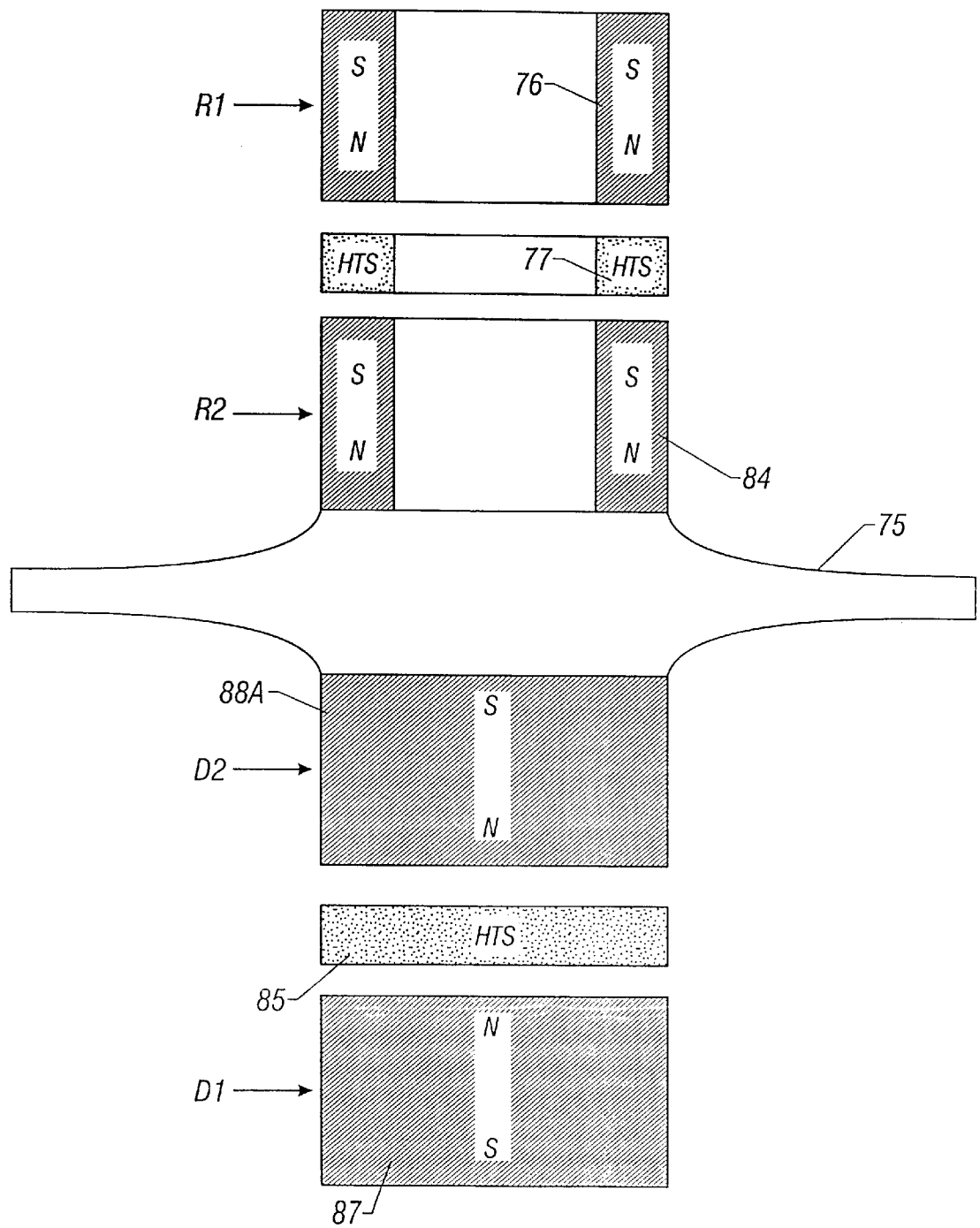

To demonstrate the viability of the field-cooled hybrid HTS flywheel system, flywheel system 60 as shown in FIGS. 5, 6 and 7(*a*) was built.

FIG. 5 is an isometric drawing of flywheel system 60, FIG. 6 is a partial cut-away of FIG. 5 showing the various magnets included in flywheel system 60, FIG. 7(*a*) is a schematic showing the various magnets of system 60, and FIG. 7(*b*) is a schematic of a proposed embodiment in which magnets 88 and 90 have been replaced with magnet 88A.

As shown flywheel system 60 includes flywheel 75, motor 62, stepper motor 63 for the top chamfer, stepper motor 71 for the bottom chamfer, rotor engaging switch 65, HTS cold stage 66, support posts 61, lateral supports 64, linear bearings 74 which allow movement of lateral supports 64 along support posts 61, HTS cold stage 69, cold stage 95, shaft 83, clutch 68, back-up bearings 81 and base support plate 72.

Flywheel system 60 further includes stator permanent ring magnet 76, stator HTS ring 77 cooled by cold stage 66, rotor permanent ring magnet 84, rotor assembly 75, rotor permanent ring magnet 90, stator permanent disc magnet 88, stator HTS disc 85 cooled by cold stage 69, and stator permanent disc magnet 87, and shown in FIG. 6, a stator ring of HTS discs 92 cooled by cold stage 95, and permanent rotor ring magnet 96.

Three cold stages 66, 69 and 95 utilize liquid nitrogen circulated through a closed passage to cool the HTS material. The cold stage 66 near the top of system 60 cools HTS material 77, a ring-shaped YBCO sample (of 1.5" O.D.× 0.75" I.D.×0.25" thick) which interacts with the attracting magnets 76 and 84. The cold stage 69 near the bottom of system 60 cools HTS material 85, a 1.5" diameter×0.25" thick disk-shaped YBCO material which interacts with the repelling magnets 90, 88 and 87. The third cold stage, cools disc 92, a disc measuring 6" O.D.×3" I.D. and contains 12 circular pieces of HTS (each 0.75" diameter and 0.75" thick) aligned along the perimeter of a circle of 4" diameter. This array of superconductors 92 interacts with 0.375" thick flywheel ring magnet 96 of 4" O.D.×2.75" I.D. in acquiring excessive lateral stability.

When the HTS samples 77, 85 and 92 are not yet cold enough to be superconducting, the flywheel itself is held in position by a pair of coaxial chamfers (circularly beveled hollow cylinders) clamping the mechanical bearings affixed to both sides of the flywheel. The axial positions of these two chamfers are independently adjustable using remotely controlled stepper motors 63 and 71, without breaking vacuum. These mechanical bearings also serve as a safety backup for the flywheel.

In operation, flywheel system 60 is placed in vacuum, with flywheel 75 clamped and spun up to speed by engaging the motor-generator 62 to the flywheel through an electromagnetic coupling switch 68 placed on the central axis 83. As a desired speed is acquired, motor 62 is disengaged and the chamfers released, leaving the flywheel 75 spinning freely suspended in vacuum. The vacuum level is expected to go down to $10^{-5}$ torr through rough-pumping followed by diffusion pumping the whole system enclosed by a bell jar and a stainless steel base plate. At present, however, only rough pumping has been employed and the vacuum was about $10^{-2}$ torr at which the windage drag was expected to significantly affect the energy storage efficiency.

Thrust and stiffness are two major parameters in assessing bearing performance. The general rule in hybrid HTS bearing design is to make the inherent instability from magnet to magnet interactions weak enough for HTS to compensate. In the flywheel system of this example, the thrusts are by and large equally shared by the top magnets 76 and 84, and by the bottom magnets 87, 88, and 90, as summarized in Table 1, each providing about 21 lb. (9.5 kg) of lifting forces. The top attracting magnets 76 and 84 (magnet 76 stationary and magnet 84 on the flywheel) are ring-shaped with dimensions of 1.5" O.D.×0.626" I.D.×1.125" thick, as detailed in FIG. 7(*a*). Although the top magnets give a negative axial stiffness of −7.7 N/mm (as attractive magnets tends to crash into each other), the repelling magnets on the bottom slightly alleviate the instability by adding 2.2 N/mm to it, yielding a −5.5 N/mm axial stiffness. While still unstable, the top HTS sample 77 and the bottom HTS sample 85 provide 26–35 N/mm of total axial stiffness (depending on the gap distances between the HTS samples and the flywheel magnets) which results in a net positive stiffness of 20–30 N/mm.

TABLE I

A Summary of Bearing Component Thrust and Stiffness

|  | Top Magnets (76 and 84) | Top HTS (77) | Bottom Magnets (87, 88, 90) | Bottom HTS (85) |
| --- | --- | --- | --- | --- |
| Thrust kg (lb.) | 9.5 (21) | <1 (<2.2) | 9.5 (21) | <1 (<2.2) |
| Axial Stiffness N/mm (lb./in.) | −7.7 (−44) | 10–15 (57–87) | 2.2 (12.5) | 16–20 (90–114) |

TABLE I-continued

A Summary of Bearing Component Thrust and Stiffness

|  | Top Magnets (76 and 84) | Top HTS (77) | Bottom Magnets (87, 88, 90) | Bottom HTS (85) |
|---|---|---|---|---|
| Radial Stiffness N/mm (lb./in.) | 3.8 (22) | 2 (11) | −1 (−5.7) | 6–8 (34–48) |

The bottom repelling magnets included a solid cylindrical magnet 87 (1.5" diameter×1.125" thick) repelling the flywheel magnet 90 (1.5" OD.×1" ID.×1.125" thick) in the axial direction and a smaller pin magnet 88 of 0.65" diameter×0.75" length, which is affixed to the bottom cold stage, repelling the flywheel in radial direction. This magnet 88, besides providing part of the lifting force, reduces the radial instability between the bottom solid magnet 87 and the bottom flywheel magnet 90. The total measured radial instability of the bottom magnet assembly is much smaller than the stiffness provided by the bottom HTS member 85 interacting with the flywheel magnet and thus can be easily counterbalanced, resulting in net radial stability. Radial stability is further enhanced by HTS assembly 92 which includes 12 pieces of ¾"×¾" samples interacting with the 4"×2.75" ring magnet 96.

Figure 8:
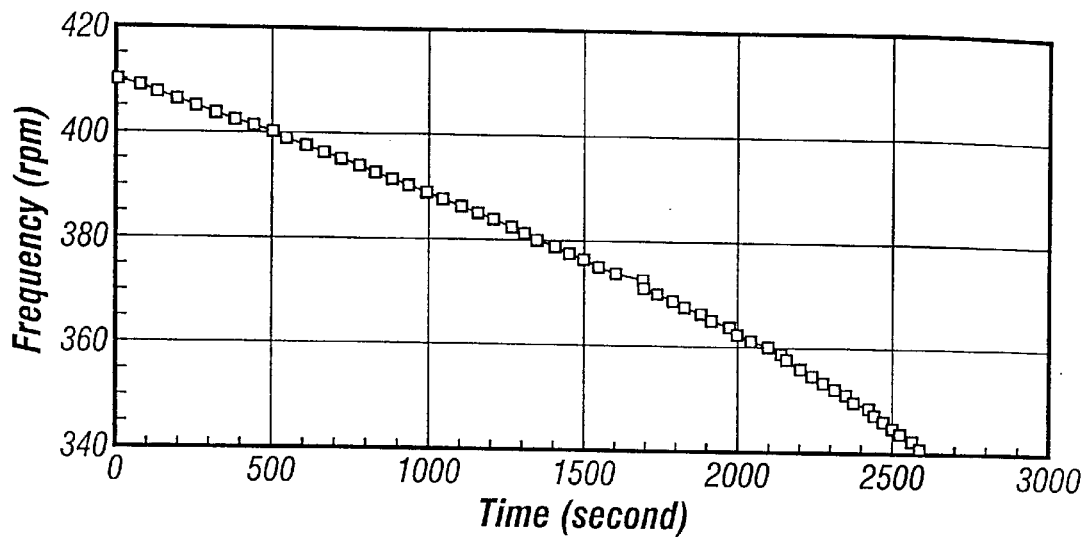
FIG. 8 is a graph showing the spin-down curve for the flywheel system of Example 1, showing spin down from about 430 rpm to about 340 rpm over 2600 seconds at $10^{-2}$ torr vacuum.

In a spin-down test at $10^{-2}$ torr vacuum, the flywheel system was levitated and rotated smoothly up to 410 rpm. After 2600 seconds, the flywheel was operating at 340 rpm, with rpm losses occurring in a generally linear fashion with respect to time, see FIG. 8, Spin down curve. Average energy loss per hour as a percentage of initial kinetic energy stored was about 43 percent. The rotor was observed to whirl during rotation. Therefore, in addition to windage drag, magnetic hysteresis loss, incurred from the flux sweeping in and out of the HTS due to external field variation, was believed to have contributed to a significant fraction of the energy losses. It was later discovered that some of the whirling was caused by a slightly loosened part on the bottom HTS cold stage.

Figure 9:
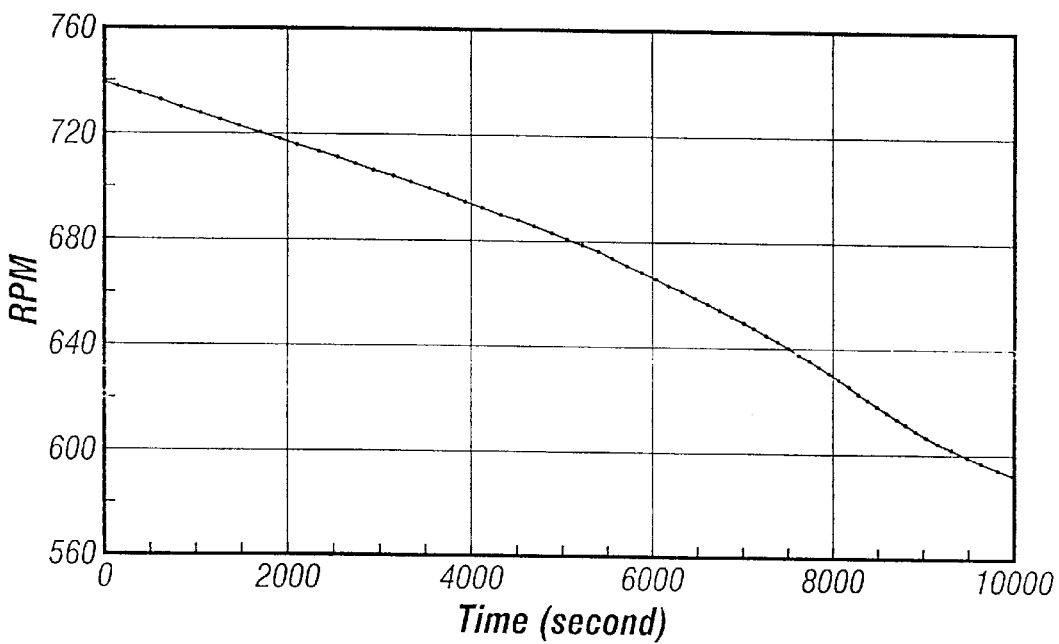
FIG. 9 is a graph showing the spin-down curve for the flywheel system of Example 1, showing spin down from about 740 rpm to about 590 rpm over 9900 seconds at $7\times10^{-3}$ torr vacuum.

A second spin-down test was conducted at a much lower vacuum, $7\times10^{-3}$ torr. The rotor was levitated and rotated smoothly up to 740 rpm. After 9900 seconds, the rotor was rotating at 590 rpm, with rpm losses occurring in a generally linear fashion with respect to time, see FIG. 9, Spin down curve. Average energy loss per hour as a percentage of initial kinetic energy stored was about 13 percent.

Without being limited to theory, applicants believe that the energy loss in these spin down tests can be traced to (i) aerodynamic drag from the residual gas, present even under 7 mtorr vacuum; (ii) magnetic hysteresis loss coming from the magnets used having slight deviations from perfect axisymmetry; and (iii) eddy current loss for the same reason. Very often, these effects are exacerbated by a minute misalignment of the rotation axis. There is nothing in principle to prevent the reduction of energy loss to as low a level as desired.

In fact, a third spin down test at the same vacuum of $7\times10^{-3}$ torr was performed, utilizing a more careful alignment of the magnets with the rotation axis of the flywheel. The rotor was levitated and rotated smoothly up to 2000 rpm. The motor was then disengaged from the flywheel, which rotated for 20 minutes without any noticeable drop in speed. The liquid nitrogen supply was exhausted at the end of this 20 minute run, at which time the experiment was aborted. Energy loss for this 20 minute run was estimated at about 5% per hour.

Example 2—Azimuth Mount of a Lunar Telescope

Figure 10:
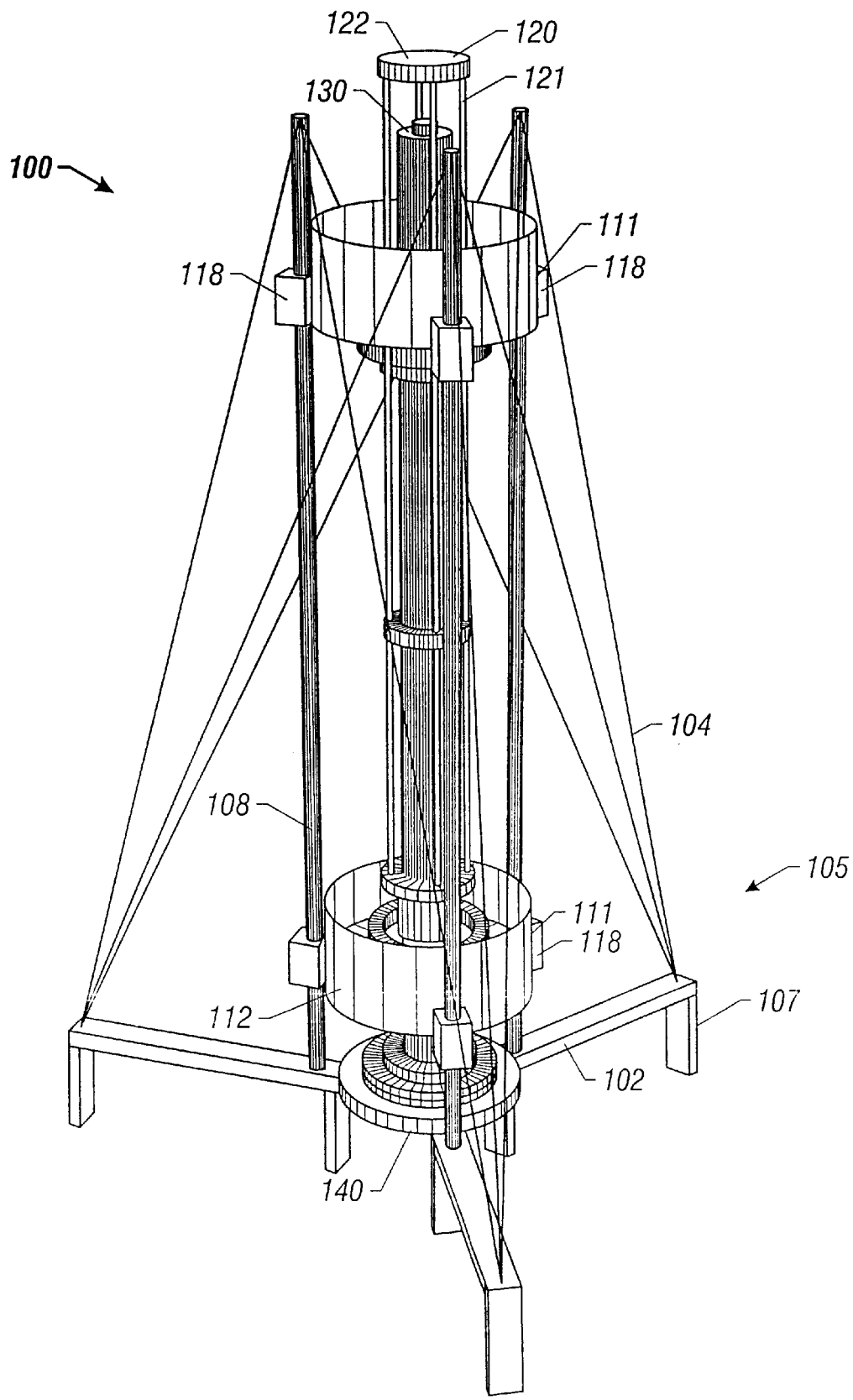
FIG. 10 is a three-dimensional overview of the telescope assembly 100 of Example 2.
Figure 11:
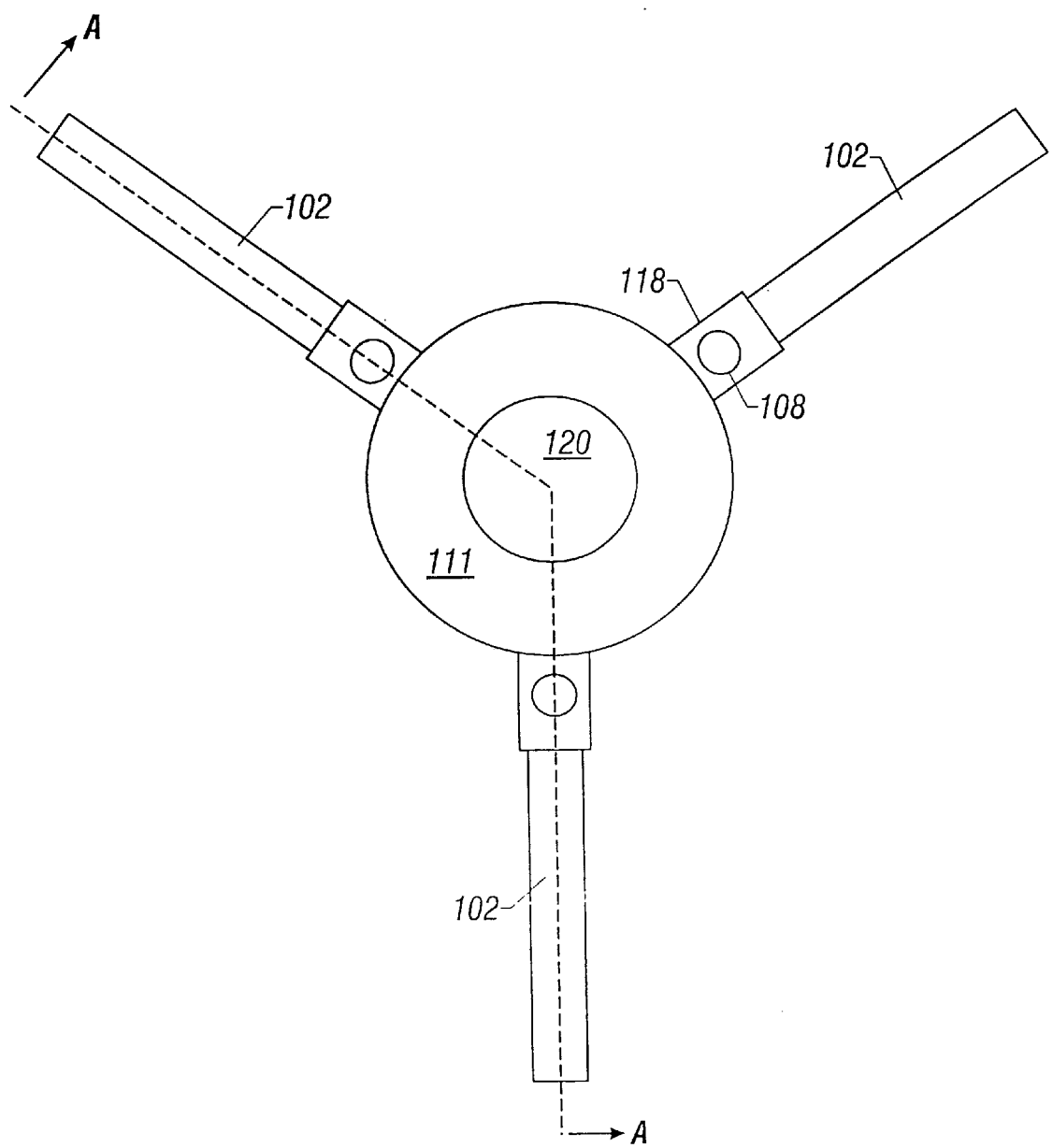
FIG. 11 is a view which shows a top view of assembly 100 of FIG. 10.
Figure 12:
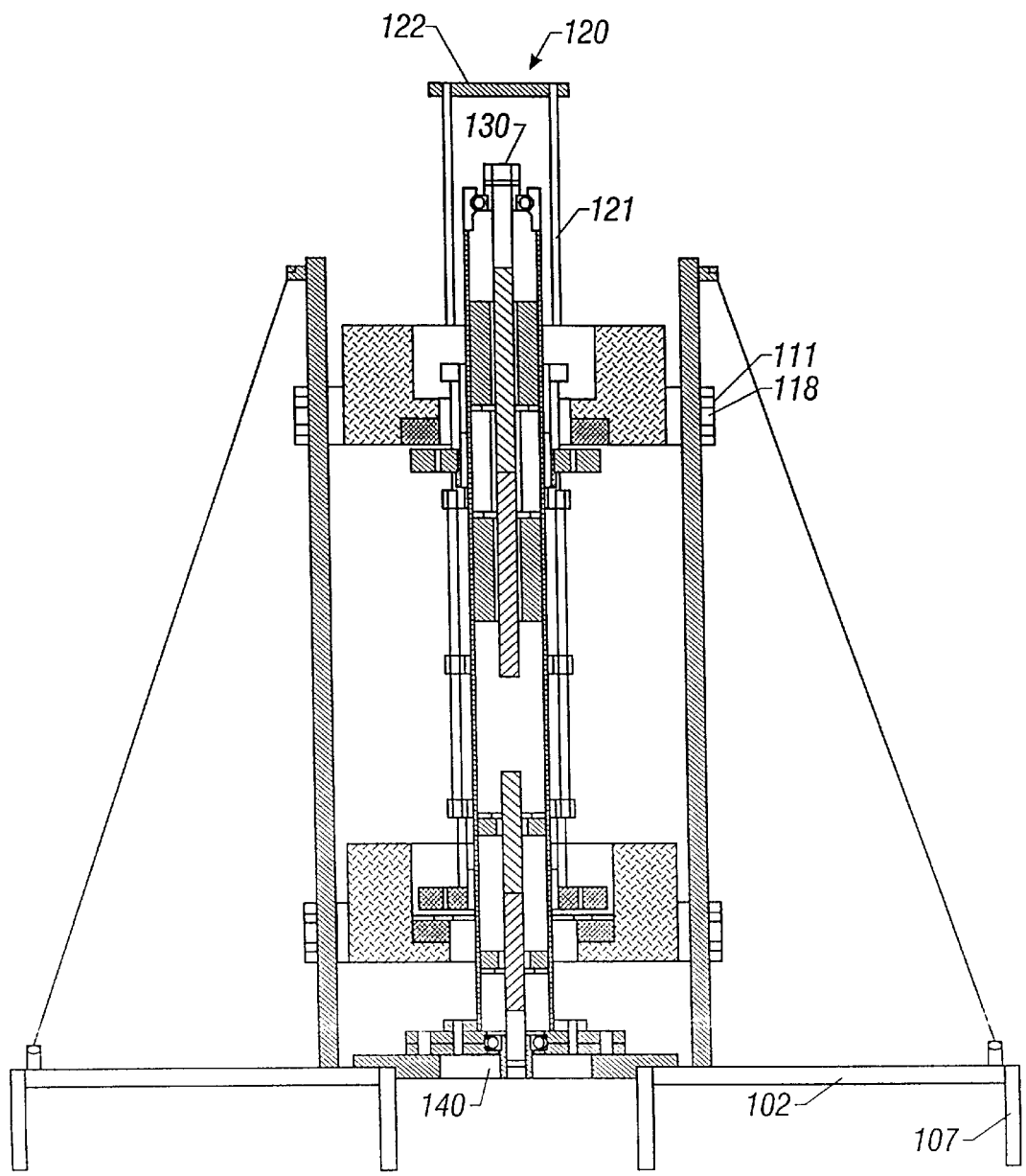
FIG. 12 is a cross-sectional view of assembly 100 at section A—A of FIG. 11.
Figure 13:
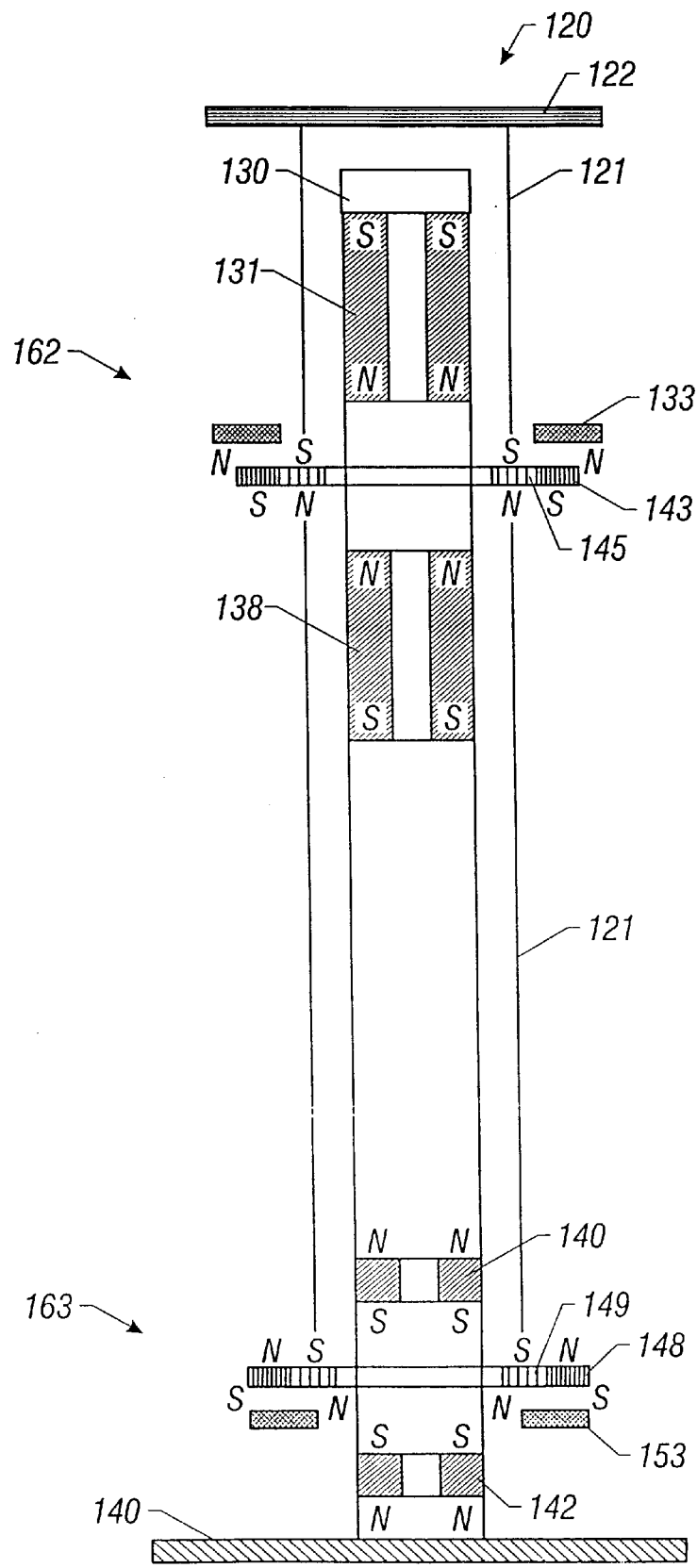
FIG. 13 is a schematic representation of the magnets and HTS materials of assembly 100 shown in FIG. 13.
Figure 14A:
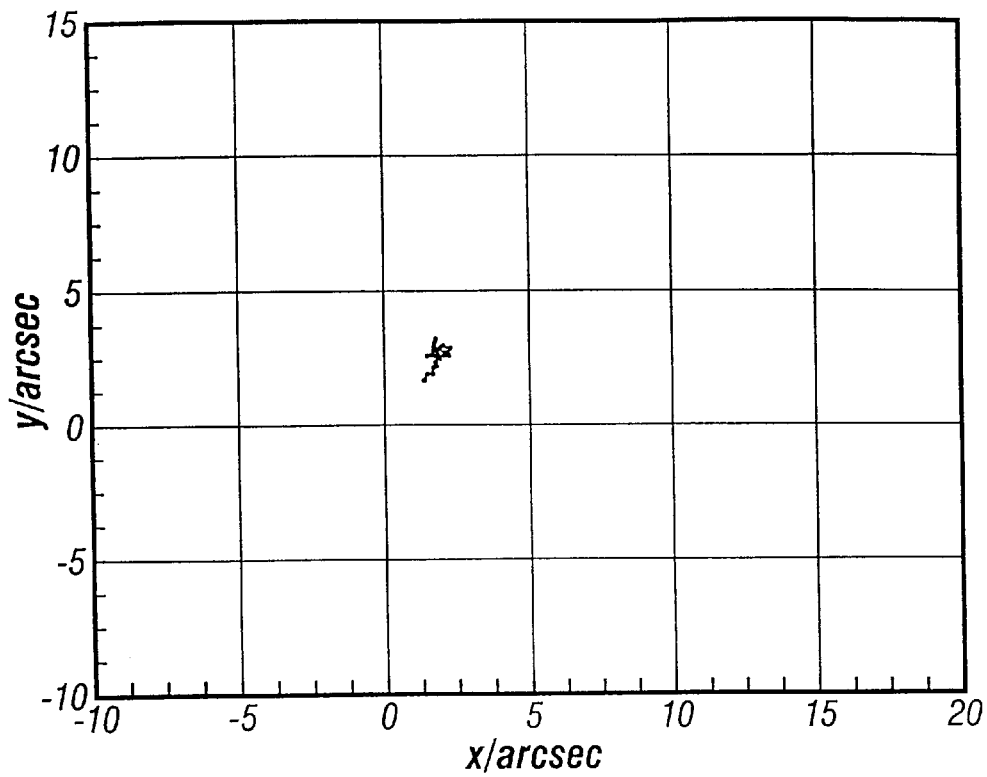
FIGS. 14(*a*)–14(*e*) are graphs showing the results of data gathered in Example 2 for a laser mounted on the experimental telescope stand, showing traces of the laser spot on a sensor, for the various time periods of 8 ms, 64 ms, 0.5 s, 8 s, and 32 s.
Figure 14B:
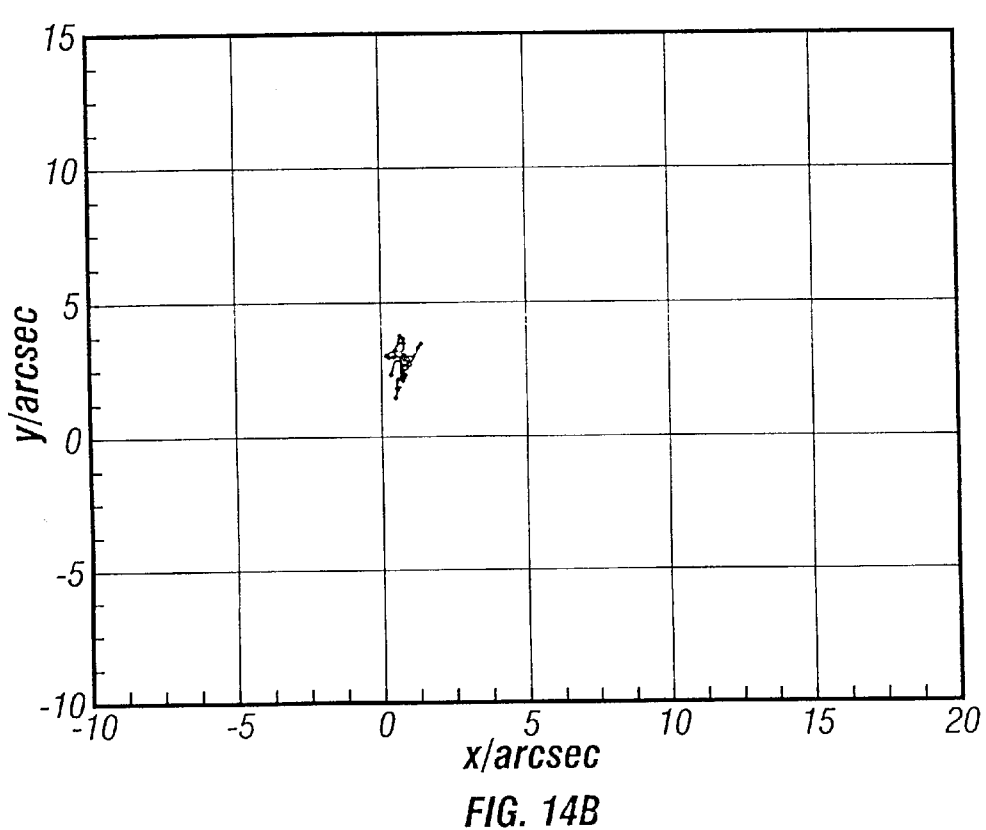
Figure 14C:
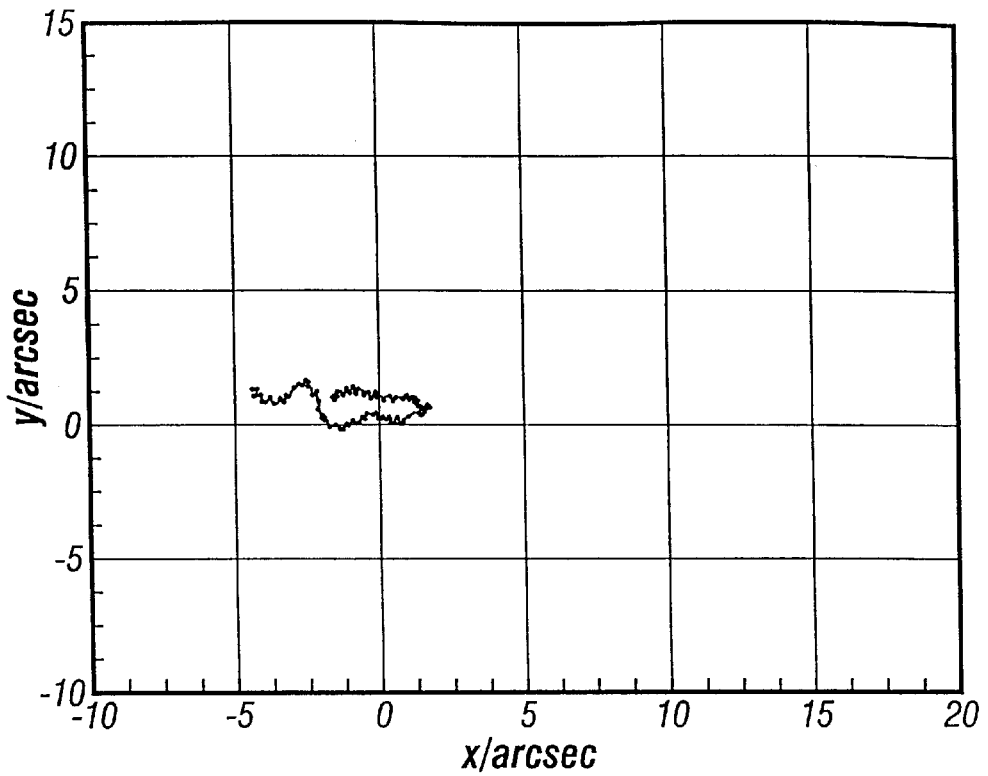
Figure 14D:
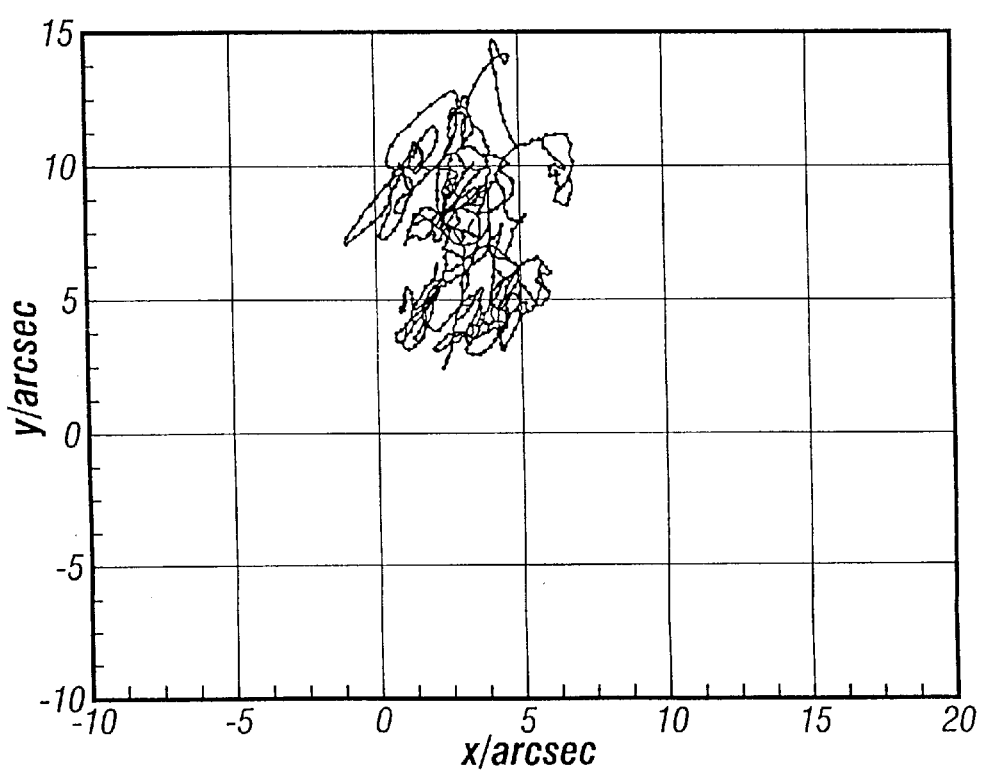
Figure 14E:
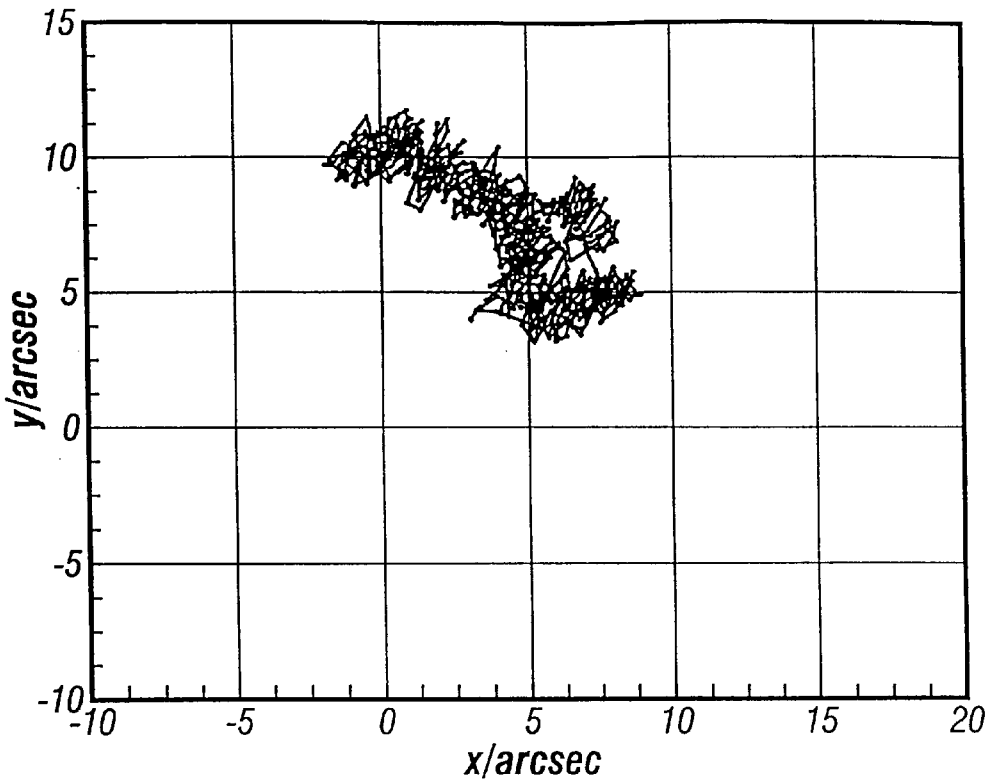

The bearing on the azimuth mount of a lightweight telescope to be used on the moon need support only a very light load, but stability is still essential. On earth, this is achieved by using counterweights, so that the center of gravity of the telescope assembly falls below the pivotal point of support. This entails additional mass to be added to the telescope assembly, which is undesirable for a telescope to be transported to the moon. This embodiment takes care of this problem by providing an effective counterweight with magnetic forces in the same way that these were utilized to support the weight of the telescope assembly itself. A three-dimensional overview of the telescope assembly 100 is presented in FIG. 10. FIG. 11 shows a top view of assembly 100 of FIG. 10. A cross-sectional view of assembly 100 at section A—A of FIG. 11, is shown in FIG. 12, with a schematic representation of the magnets and HTS materials of assembly 100 shown in FIG. 13.

Assembly 100 includes support base 105 having lateral supports 102, legs 107, vertical supports 108, and support wires 104. Cryogenic systems 111 are secured to vertical supports 108 by brackets 118. Center assembly 130 is secured to base 140. Rotational assembly 120, includes telescope mounting platform 122, and vertical supports 121. In operation, rotational assembly 120 will be levitated above and will rotate around center assembly 130 to orient the telescope (not shown) mounted on mounting platform 122 to the desired orientation.

Bottom magnetic bearing system 163 includes ring magnets 140 and 142, both located on the center assembly 130, and includes ring magnet 149 coupled with ring magnet 148 of opposite polarity both located on rotational assembly 120. Ring magnet is attracted downward toward magnet 142 and away from magnet 140.

Top magnetic bearing system 162 includes magnets 131 and 138, both located on the center assembly 130, and includes ring magnet 145 coupled with opposite polarity ring magnet 143, both located on rotational assembly 120. Ring 145 magnet is attracted upward toward magnet 131 and away from magnet 138. Magnetic bearing system 162 must provide a thrust that is the sum total of the counter weight thrust of system 163 and the actual weight of the telescope assembly. Each of these systems 162 and 163 is designed with neutral stability for the magnets.

The opposite polarities of magnets 148 and 149 of bottom system 163, and of magnets 143 and 145 of top system 162, were designed to strengthen the stability obtainable from the HTSs by maximizing the gradient of the magnetic field that would be frozen into the superconductors. However, the opposite polarity arrangement also implies that the thrust that can be obtained from this volume of magnetic material is just the net of two opposing thrust, and is not the optimal. It can be done in this example, as the weight to be supported is not excessive.

The stator magnets 131, 138, 140 and 142 are cylindrical magnets with a center hole, placed symmetrically above and below the corresponding rotor magnets. The stator magnets 131 and 138 of the top bearing 162 are taller to provide a higher thrust. The distance between the stator magnets in each of these pairs (131 & 138, and 140 & 142, can be adjusted without destroying the symmetry of the positioning with respect to the corresponding rotor magnet. This allows the thrusts provided by bearing systems 162 and 163 to cover a finite range without giving up the condition of neutral stability for the magnets.

In the example model, top bearing system 162 can support an axial load of 45 N. It has been used to support a model telescope with a weight of 12 N, the equivalent counterweight of 12 N from the bottom bearing, the weight of the levitated structure itself making up the remainder. The entire assembly has been observed to rotate continuously under its own inertia for over 45 minutes. The bearing assembly excluding the telescope is about 1 m tall. The top plate is 11.4 cm in diameter, while the base spans 56 cm. The central shaft is slightly less than 7.6 cm in diameter. The levitated structure is held in place with a total stiffness from the bearings of about 10 N/nmn in the axial direction. This low stiffness will be supplanted by the stiffness due to feedback control in the complete system. HTS member 133 and 153 are enclosed in two structures 7.6 cm tall and 16.5 cm in diameter, made of Styrofoam and G-10 glass fibre/epoxy composite and fixed separately at 25 cm and 84 cm from the top. With all the necessary fixtures included, the whole bearing assembly weighs 67 N.

To the astronomer, an important performance parameter is the stability of the bearing. In order to determine this, a mirror was mounted on mount 122 and directed a laser beam to be reflected from the mirror onto an x-y position sensor. The position of the beam on the x-y position sensor was monitored for continuous time periods of different lengths, from 8 ms to 32 s. Traces of the laser spot on the sensor are reproduced in FIGS. 14(*a*)–14(*e*), for the various time periods of 8 ms, 64 ms, 0.5 s, 8 s, and 32 s.

Figure 15:
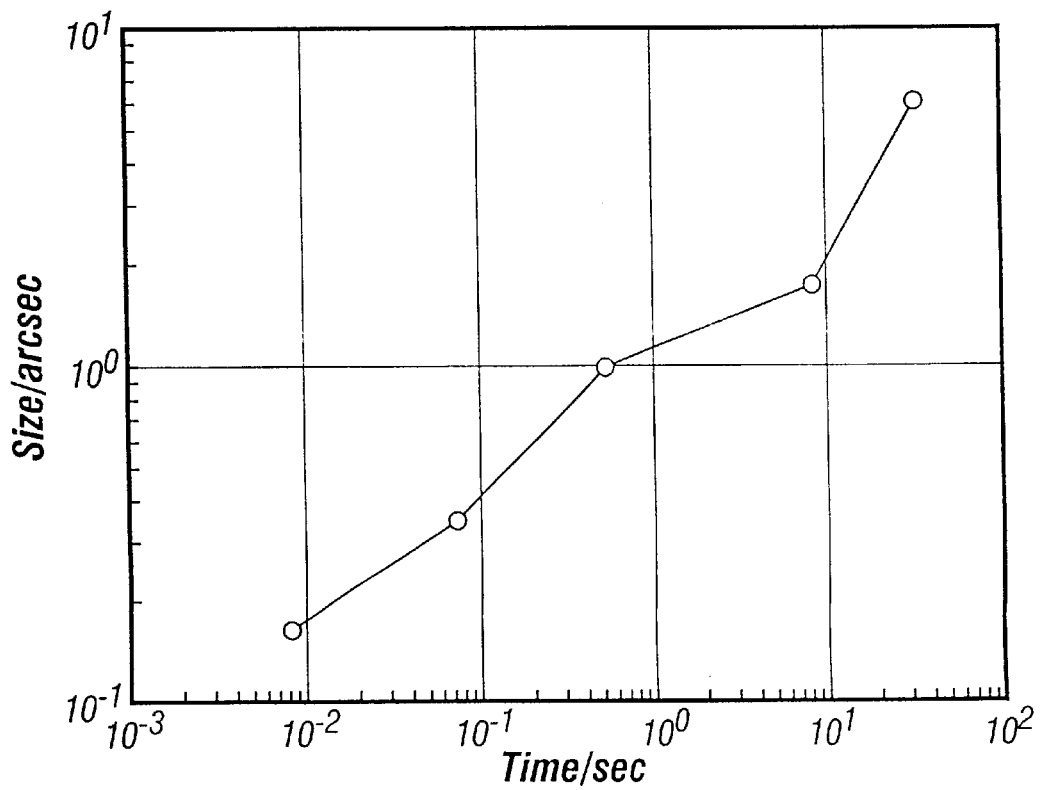
FIG. 15 is a graph of the accumulated spot size, defined by the standard deviation of the angular position from the average over the entire observation period, plotted as a function of the observation period, for the data of FIGS. 14(*a*)–14(*e*).

The accumulated spot size, defined by the standard deviation of the angular position from the average over the entire observation period, is plotted as a function of the observation period in FIG. 15. The spot size increases from about 0.97 $\mu$rad of arc at 8 ms of time to around 19.4 $\mu$rad of arc after 32 s of time. For observations from the moon, an accuracy of pointing to 0.48 $\mu$rad of arc is desirable. The angular measures were converted from the position on the x-y position sensor by dividing over the distance (3 m) from the mirror to the x-y position sensor.

It is to be understood that the apparatus of this example may also be used to mount any type of equipment, sensor, measurement device or other apparatus.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A high temperature superconducting momentum wheel device comprising:
    a rotatable flywheel including at least one magnet associated with a central region of the flywheel where the at least one magnet is symmetrically disposed about an axis of rotation of the flywheel and the poles of the at least one magnet are aligned with the rotation axis;
    a levitation system including a high temperature superconducting unit for each flywheel magnet comprising a high temperature superconducting element enclosed in a coolant reservoir having a coolant inlet and outlet for maintaining the high temperature superconducting element below its critical temperature, $T_c$ where each high temperature superconducting element is positioned adjacent the at least one flywheel magnet and levitates the flywheel to within an equilibrium gap position from the high temperature superconducting element; and
    a motor for actively interacting with the flywheel to impart a controlled spin to the flywheel.

2. The device of claim 1, further comprising spin rate sensors, motor acceleration sensors, and an electrical connector for placing the motor and sensors in electrical communication with a control system and an internal atmosphere connector for maintaining an interior of the wheel under vacuum.

3. The device of claim 1, further comprising at least one radial bearing attached to the flywheel and at least one touchdown bearing designed to engage the at least one radial bearing if levitation fails.

4. The device of claim 1, wherein the at least one magnet is a pair of oppositely poled, concentrically configured ring magnets about the rotation axis.

5. The device of claim 1, further comprising a cooling system for cooling the high temperature superconducting element below its critical temperature, $T_c$ in fluid communication with the coolant inlet and outlet.

6. The device of claim 5, wherein the cooling system comprises a cryo-cooler system.

7. The device of claim 5 wherein the coolant is helium.

8. A torque/reactive momentum control device comprising:
    at least one momentum wheel, where the at least one wheel comprises:
        a rotatable flywheel including at least one magnet associated with a central region of the flywheel where the at least one magnet is symmetrically disposed about an axis of rotation of the flywheel and the poles of the at least one magnet are aligned with the rotation axis;
        a levitation system including a high temperature superconducting unit for the at least one flywheel magnet comprising a high temperature superconducting element enclosed in a coolant reservoir having a coolant inlet and outlet for maintaining the high temperature superconducting element below its critical temperature, $T_c$ where each high temperature superconducting element is positioned adjacent a flywheel magnet and levitates the flywheel to within an equilibrium gap position from the high temperature superconducting element; and
        a motor for actively interacting with the flywheel to impart a controlled spin to the flywheel;
    a cooling system for supplying coolant to the high temperature superconducting elements of the at least one momentum wheel to maintain each high temperature superconducting element below their critical temperature;
    a control system in electric communication with the wheels for maintaining a controlled flywheel spin rate of the at least one wheel; and
    a power supply for supplying power to the at least one wheel, cryo-cooler and control system.

9. The device of claim 8, further comprising spin rate sensors, motor acceleration sensors, and an electrical connector for placing the motor and sensors in electrical communication with a control system and an internal atmosphere connector for maintaining an interior of the wheel under a vacuum.

10. The device of claim 8, further comprising at least one radial bearing attached to the flywheel and at least one touchdown bearing designed to engage the at least one radial bearing if levitation fails.

11. The device of claim 8, wherein the magnet is a pair of oppositely poled, concentrically configured ring magnets about the rotation axis.

12. The device of claim 8, wherein the cooling system comprises a cryo-cooler system and the coolant is helium.

13. The device of claim 8, the control system comprises a computer, receiving and transmitting hardware, and positioning sensors where the control system controls the power supply so that the power supply supplies known currents to each wheel resulting in a given spin rate for each wheel producing a net angular momentum.

14. The device of claim 8, further comprising a plurality of momentum wheels.

15. The device of claim 14, wherein the each momentum wheels generates a torque and the combined torque results in a total angular momentum.

16. A satellite comprising;
- a platform;
- a torque/reactive momentum control device mounted on the platform comprising:
  - a plurality of momentum wheels, where each wheel comprises:
    - a rotatable flywheel including at least one magnet associated with a central region of the flywheel where the at least one magnet is symmetrically disposed about an axis of rotation of the flywheel and the poles of the at least one magnet are aligned with the rotation axis;
    - a levitation system including a high temperature superconducting unit for each flywheel magnet comprising a high temperature superconducting element enclosed in a coolant reservoir having a coolant inlet and outlet for maintaining the high temperature superconducting element below its critical temperature, $T_c$ where each high temperature superconducting element is positioned adjacent a flywheel magnet and levitates the flywheel to within an equilibrium gap position from the high temperature superconducting element; and
    - a motor for actively interacting with the flywheel to impart a controlled spin to the flywheel;
  - a cooling system for supplying coolant to the high temperature superconducting elements of each momentum wheel to maintain each high temperature superconducting element below their critical temperature;
  - a control system in electric communication with the wheels for maintaining a controlled flywheel spin rate of each wheel; and
  - a power supply for supplying power to each wheel, cryo-cooler and control system;
- where the torque/reactive momentum control device controls the attitude and orientation of the satellite.

17. The satellite of claim 16, further comprising spin rate sensors, motor acceleration sensors, and an electrical connector for placing the motor and sensors in electrical communication with a control system, an internal atmosphere connector for maintaining an interior of the wheel under a vacuum and at least one radial bearing attached to the flywheel and at least one touchdown bearing designed to engage the at least one radial bearing if levitation fails.

18. The satellite of claim 16, wherein the magnet is a pair of oppositely poled, concentrically configured ring magnets about the rotation axis and wherein the cooling system comprises a cryo-cooler system and the coolant is helium.

19. The satellite of claim 16, wherein the control system comprises a computer, receiving and transmitting hardware, and positioning sensors where the control system controls the power supply so that the power supply supplies known currents to the at least one wheel resulting in a given spin rate for the at least one wheel producing a net angular momentum and wherein the at least one momentum wheels generates a torque and the combined torque results in a total angular momentum imparted to the satellite.

20. The satellite of claim 16, wherein in response to a command to change attitude and orientation, the control system computes currents which when supplied to the momentum wheel will cause the wheel to change their flywheel spin rate giving rise to a new total angular momentum and continually modifying the currents until a new attitude and orientation of the satellite is achieved.

* * * * *